(12) United States Patent
Yamamoto et al.

(10) Patent No.: US 8,804,866 B2
(45) Date of Patent: Aug. 12, 2014

(54) DIGITAL BROADCAST RECEIVING APPARATUS AND DIGITAL BROADCAST RECEIVING METHOD

(75) Inventors: Kohsuke Yamamoto, Osaka (JP); Tomohiko Taniguchi, Osaka (JP)

(73) Assignee: Panasonic Corporation, Osaka (JP)

( * ) Notice: Subject to any disclaimer, the term of this patent is extended or adjusted under 35 U.S.C. 154(b) by 91 days.

(21) Appl. No.: 13/695,425

(22) PCT Filed: May 9, 2011

(86) PCT No.: PCT/JP2011/002574
§ 371 (c)(1),
(2), (4) Date: Oct. 30, 2012

(87) PCT Pub. No.: WO2011/142113
PCT Pub. Date: Nov. 17, 2011

(65) Prior Publication Data
US 2013/0044840 A1    Feb. 21, 2013

(30) Foreign Application Priority Data

May 10, 2010  (JP) .................................. 2010-107834

(51) Int. Cl.
H04L 1/02        (2006.01)
H04B 7/02        (2006.01)
H04H 20/22       (2008.01)
H04L 27/26       (2006.01)
H04N 21/2389     (2011.01)
H04N 21/647      (2011.01)
H04N 21/61       (2011.01)

(52) U.S. Cl.
CPC ........ *H04L 27/2662* (2013.01); *H04N 21/2389* (2013.01); *H04H 2201/60* (2013.01); *H04H 20/22* (2013.01); *H04N 21/64761* (2013.01); *H04N 21/6112* (2013.01); *H04N 21/6143* (2013.01)
USPC ............................. 375/267; 375/347; 375/349

(58) Field of Classification Search
USPC ................. 375/260, 267, 340, 343, 347, 349; 455/137, 273
See application file for complete search history.

(56) References Cited

U.S. PATENT DOCUMENTS

| 6,247,158 | B1 | 6/2001 | Smallcomb | |
|---|---|---|---|---|
| 6,944,139 | B1 | 9/2005 | Campanella | |
| 6,970,686 | B2 * | 11/2005 | Mizoguchi et al. | 455/273 |
| 7,310,503 | B2 * | 12/2007 | Ido | 455/140 |
| 8,385,486 | B2 * | 2/2013 | Soga et al. | 375/347 |
| 2005/0163261 | A1 * | 7/2005 | Nakao et al. | 375/343 |
| 2010/0172429 | A1 * | 7/2010 | Nagahama et al. | 375/267 |

FOREIGN PATENT DOCUMENTS

| JP | 2001-136113 | 5/2001 |
|---|---|---|
| JP | 2004-343639 | 12/2004 |
| JP | 2005-210648 | 8/2005 |
| JP | 2007-281878 | 10/2007 |
| JP | 2008-153832 | 7/2008 |
| JP | 2008-193385 | 8/2008 |
| JP | 2010-035222 | 2/2010 |

* cited by examiner

Primary Examiner — David B. Lugo

(57) ABSTRACT

Disclosed is a digital broadcast receiver which includes a TS processing unit. The TS processing unit comprises reference packet detection units (162*a*, 162*b*), that detect timing information of two sets of received TS packet data, a delay adjustment unit (163) that aligns the processing timings of both sets of TS packet data by delaying one of the two sets of TS packet data based on the detected timing information, and a selection unit (165) that selects by packet one of the two sets of TS packet data for output.

5 Claims, 31 Drawing Sheets

DIGITAL BROADCAST RECEIVING APPARATUS AND DIGITAL BROADCAST RECEIVING METHOD

TECHNICAL FIELD

The present invention relates to digital broadcast receivers and digital broadcast receiving methods of the OFDM (Orthogonal Frequency Division Multiplexing) modulation method used in terrestrial digital broadcasting, etc, and in particular to digital broadcast receivers and digital broadcast receiving methods which receive terrestrial digital broadcasts sent from different relay stations.

BACKGROUND ART

Preparations for the terrestrial digital broadcasting method ISDB-T (Integrated Services Digital Broadcasting—Terrestrial) are proceeding as Japan's terrestrial television broadcasting faces the end of terrestrial analogue broadcasts, scheduled for July 2011.

Recently, small-scale transmission output relay stations in particular are being prepared in every region of the country. In terrestrial digital broadcasting, it has become possible to send broadcast signals of the same content on the same frequency from a plurality of relay stations, known as the SFN (Single Frequency Network) method, as a result of the introduction of a guard interval structure where the OFDM modulation method is applied. Also in terrestrial digital broadcasting, relay station networks are being constructed that use the SFN method together with the MFN (Multi Frequency Network) method where the physical channel changes with each relay station.

In this environment, moving vehicles receiving terrestrial digital broadcasts while moving will need to set up the receiving channel again when leaving the broadcasting area that applies to the broadcast currently being viewed, and entering the broadcasting area of a new relay station.

FIG. 30 is a block diagram showing the structure of a conventional first digital broadcast receiver (for example, refer to Patent Literature 1).

The digital broadcast receiver 5100 shown in FIG. 30 includes (i) a first front end unit 5101 which outputs packet data of a first TS (Transport Stream) after having acquired a received digital broadcast and performed demodulation, (ii) a second front end unit 5102 which outputs packet data of a second TS after having acquired a digital broadcast of a frequency that is different from the signal acquired by the first front end unit 5101, and after having performed demodulation, (iii) a TS selector unit 5103 which selects and outputs one of either the first TS packet data or the second TS packet data, (iv) a data separating unit 5104 which separates a predetermined signal from the output of the TS selector unit 5103, (v) a decoder unit 5105 which decodes and outputs the fixed signal separated by the data separating unit 5104, and (vi) a reception stability judgment unit 5106 which judges the reception stability of the first front end unit 5101 and the second front end unit 5102 based on the reception status information outputted from the first front end unit 5101 and the second front end unit 5102 and the tuning status information outputted from the data separating unit 5104.

The TS selector unit 5103 selects by TS packet unit one of either the first TS packet data group or the second TS packet data group based on the judgment results of the reception stability judgment unit 5106, and outputs the data.

The conventional first digital broadcast receiver 5100 has two systems of digital broadcast front end units, and when receiving signals at a location where a plurality of transmission station (relay station) broadcast areas overlap, one of the front end units is used to receive and demodulate signals sent from one of the transmitting stations, and the other front end unit is used to receive and demodulate signals sent by a different frequency. Then, the digital broadcast receiver 5100 extracts tuning information from within the TS packet data acquired from the respective front end units, and selects for output by packet unit, one of the TS packet data groups outputted from both front end units, in accordance with the separately generated reception stability judgment results. In this way, a digital broadcast receiver is proposed which receives and demodulates broadcasts of the same content with different receiving frequencies and selects the demodulated signal for use.

Also, FIG. 31 is a block diagram showing the structure of a conventional second digital broadcast receiver (for example, refer to Patent Literature 2). The conventional second digital broadcast receiver 5200 shown in FIG. 31 includes a first antenna 5201, a second antenna 5202, a first tuner 5203, a second 5204, a first demodulation unit 5205, a second demodulation unit 5206, a first coefficient setting unit 5207, a second coefficient setting unit 5208, a signal synthesis unit 5209 and a control unit 5210.

When setting up the digital broadcast receiver 5200, the first tuner 5203 and the second tuner 5204, being controlled by the control unit 5210, change the reception channel and perform a scan process of relay stations from which reception is possible. When the scan has been completed, the control unit 5210 changes the reception channel of the second tuner 5204 to the frequency of the channel which is sending the same broadcast as that of the broadcast program which the first tuner 5203 is tuned in to. The first demodulation unit 5205 and the second demodulation unit 5206, after receiving and demodulating a signal from both the first tuner 5203 and second tuner 5204, output the demodulation signals to both of the first coefficient setting unit 5207 and second coefficient setting unit 5208. The first coefficient setting unit 5207 and second coefficient setting unit 5208, after multiplying the weighted coefficient indicated by the control unit 5210 by the demodulation signals, output the demodulation signals to the signal synthesis unit 5209. The signal synthesis unit 5209 adds the post-weighting demodulation signals that have been outputted from the first coefficient setting unit 5207 and second coefficient setting unit 5208, and outputs the result to the subsequent decoding unit of the digital broadcast receiver 5200.

The conventional second digital broadcast receiver 5200, as is described above, has two systems of digital broadcast demodulation units, and when in an area where a same broadcast program is sent from a first relay station and second relay station on channels with different frequencies, the second digital broadcast receiver 5200 receives signals from both the first relay station and second relay station together, and actualizes diversity reception in view of the reception state of the broadcasting from the first and second relay stations.

CITATION LIST

Patent Literature

[Patent Literature 1] Japanese Patent Application Publication No. 2008-153832
[Patent Literature 2] Japanese Patent Application Publication No. 2008-193385

SUMMARY OF INVENTION

Technical Problem

However, whilst the conventional first digital broadcast receiver mentioned above is structured to select TS packets when the same TS packet data is sent on different frequencies from a plurality of relay stations, when there is a reception timing difference of the TS packet data acquired from the relay stations, it is not possible for appropriate TS packet data to be selected and outputted. The reception timing of TS packet data changes according to the structure of the network between the broadcasting station and the relay station, or the location relation between the point of reception and the relay station. For example, there are three scenarios for the structure of a network between a broadcasting station and relay station, as follows.

In the first scenario, TS packet data is generated by the broadcasting station and distributed to each relay station, then a modulation signal for the TS packet data is generated at the relay station.

In the second scenario, TS packet data is generated by the broadcasting station and sent, after an OFDM modulation signal is generated, to each relay station as a signal at a different frequency than the broadcast frequency. The relay station then transmits a signal after frequency conversion to the frequency for transmission.

In the third scenario, a signal sent from a relay station is received, and re-sent after frequency conversion.

If there is a time difference between the received TS packets when two sets of TS packet data are selected by packet with no thought to reception timing difference, as in the conventional first digital broadcast receiver 5100, then the outputted TS packet data will be a discontinuous packet sequence. Therefore, a problem arises whereby the TS packet data will be an inappropriate packet when the exchange process is performed.

The conventional second digital broadcast receiver 5200 attempts to improve reception ability by achieving diversity combining at the time of demodulating the OFDM signal from the two relay stations, when receiving, at the same time, the broadcast signal structured from the same TS packet data at different frequencies, in areas which can receive respective signals sent from a plurality of relay stations. However, a situation where the arrival time of the two broadcast waves from the different relay stations exceeds the guard interval length must also be considered. When the arrival time of the two broadcast waves exceeds the guard interval length, a problem arises whereby signals of different symbol numbers are combined, and the correct diversity combined OFDM signal is not generated.

The first objective of the present invention is to resolve the conventional issues by providing a digital broadcast receiver that performs selection and combination of two sets of TS packet data by detecting the signal timing difference between the two sets of TS packet data and aligning the timing between the TS packet data sets.

The second objective is to provide a digital broadcast receiver that can perform diversity combining by OFDM carrier unit, upon detecting and correcting, by signal unit, the signal timing between a plurality of received OFDM signals using information on the reception timing difference between the detected two sets of TS packet data.

Solution to Problem

To solve the above problem, the present invention is a digital broadcast receiver comprising: a plurality of tuning units that acquire, from among OFDM signals received with an antenna, OFDM signals of a tuned-to frequency band; a plurality of demodulation units that perform demodulation processes for each of the plurality of OFDM signals received from the plurality of tuning units; a decoding unit that performs error correction decoding for the diversity combining results and a TS processing unit that selects TS packet data to be outputted for display from among a plurality of pieces of TS packet data outputted from the decode unit, and then outputs the data, wherein the TS processing unit calculates an acquired timing difference between TS packet data received from at least two systems of reception, aligns the processing timings of the TS packet data acquired from the at least two systems of reception by delaying a portion of the TS packet data in accordance with the detected acquired timing difference, and selects the TS packet data to be outputted.

With the above structure, when receiving broadcast waves made of the same TS packets on different frequencies for areas where signals sent by a plurality of relay stations can be received, it is possible to select signals for use after amending reception timing differences, and it is therefore possible to achieve higher quality TS packet data.

Also, the digital broadcast receiver of the present invention comprises: a plurality of tuning units that acquire, from among OFDM signals received with an antenna, OFDM signals of a tuned-to frequency band; a plurality of demodulation units that perform demodulation processes appropriate to each of the plurality of OFDM signals received from the plurality of tuning units; a diversity combining unit that receives equalized signals outputted from the plurality of demodulation units, and upon calculating a weighting ratio, performs combining of the signals; a decoding unit that performs error correction decoding for the diversity combining results and a TS processing unit that performs processing of a plurality of pieces of TS packet data outputted from the decode unit, wherein the TS processing unit calculates an acquired timing difference between TS packet data received from at least two systems of reception and feeds the detected result back to the diversity combining unit, and the diversity combining unit combines a signal after correcting the acquired timing difference between the plurality of OFDM signals, using the acquired timing difference of the TS packet data that was fed back.

With the above structure, for areas where signals sent by a plurality of relay stations can be received, it is possible to perform diversity combining after amending reception timing differences extracted from signals received when receiving broadcast signals at the same time made of the same TS packets on different frequencies. This results in an improvement in reception quality compared to a situation where only broadcast signals from a single frequency are received.

Advantageous Effects of Invention

With the above digital broadcast receiver, the reception timing difference between the two sets of TS packet data is detected and aligned when receiving, on different frequencies at the same time, a broadcast signal structured from the same TS packet data, in an area which can receive respective signals sent from a plurality of relay stations. As a result, it is possible to actualize a digital broadcasting receiver with uninterrupted audio and video, by exchanging by packet unit one of the sets of TS packet data with better reception quality.

Also, with the second aspect of the invention, when receiving, on different frequencies at the same time, a broadcast signal structured from the same TS packet data in an area which can receive respective signals sent from a plurality of relay stations, the timing difference between the two sets of TS packet data is calculated and the reception timing difference information is reported to the diversity combining unit which combines a post-demodulation signal of an OFDM signal. Then, by using the diversity combining unit, it will become possible to combine and use the signal resulting from the demodulation of the OFDM signal, making it possible to improve reception performance compared to that when a broadcast signal of a single frequency only is received.

DESCRIPTION OF EMBODIMENTS

Embodiments of the present invention are described below with reference to the drawings.

Note that the digital broadcast receiver of this invention is not specific to the following examples. Other receivers or semiconductors including wireless communication may be used in the same manner.

The digital broadcast receiver of the below-described embodiments is a receiver for reception in a moving environment, using as an example the Japanese terrestrial digital broadcasting broadcast method ISDB-T.

Embodiment 1

Figure 1:
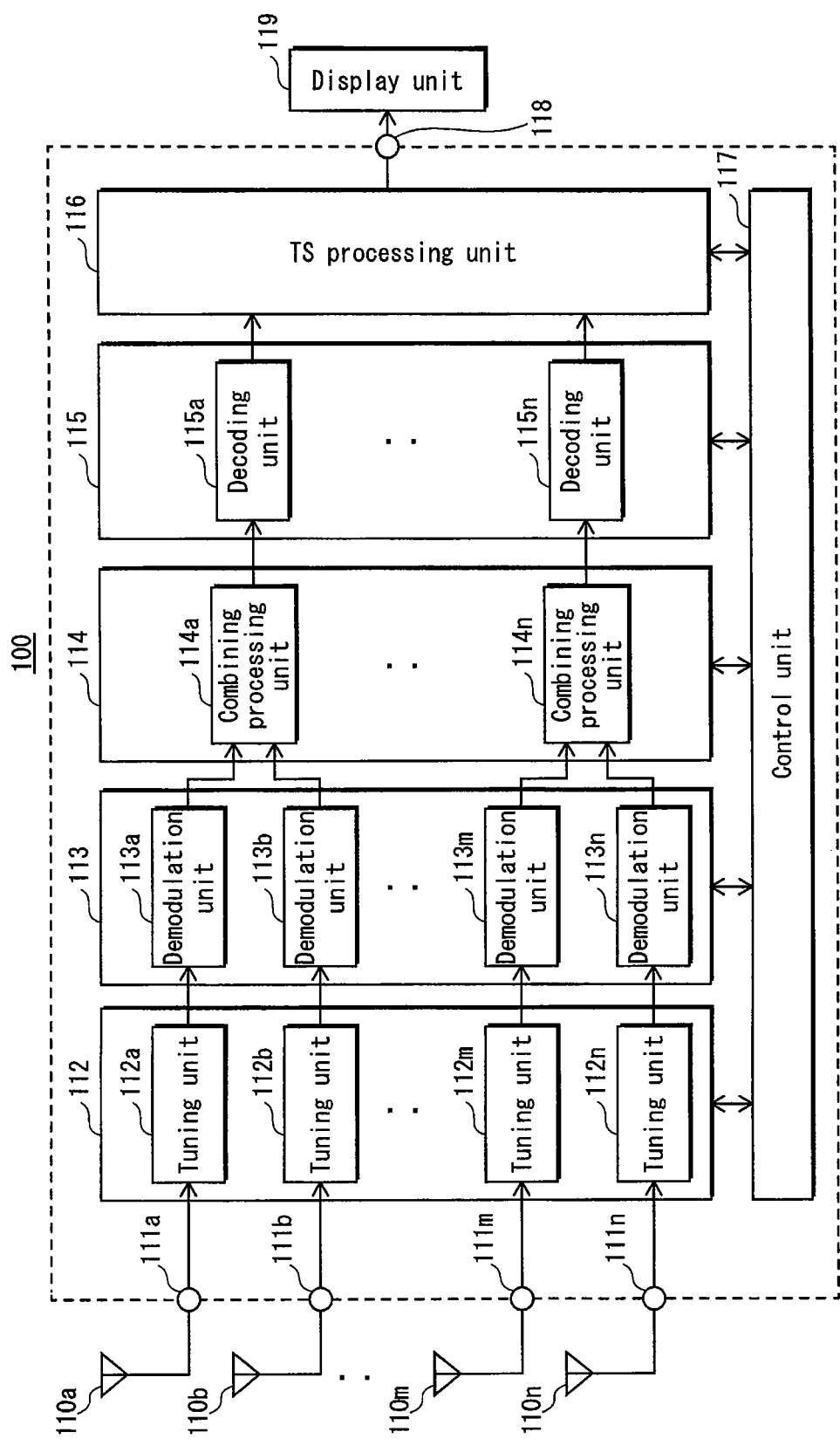
FIG. 1 is a block diagram of the digital broadcast receiver of Embodiment 1 of the present invention.

FIG. 1 is a block diagram showing the function structure of the digital broadcast receiver 100 pertaining to Embodiment 1 of the present invention.

The digital broadcast receiver shown in FIG. 1 includes antenna units 110a to 110n, connectors 111a to 111n, tuning units 112, demodulation units 113, a combining unit 114, a decoding unit 115, a TS processing unit 116, a control unit 117, a connector 118, and a display unit 119.

Here, using as an example a situation where two systems of reception are processed using four antennae, in order to receive (a) a broadcast currently being received (hereafter, broadcast under reception) and (b) a broadcast with the same TS packet data, but being sent by a relay station with a different frequency (physical channel) from the broadcast under reception, the processing system from the first antenna 110a to the demodulation unit 113a, and from the second antenna 110b to the demodulation unit 113b, is designated as the reception system receiving a current broadcast (hereafter, the first system of reception). As well, the processing system from the third antenna 110m to the demodulation unit 113m and from the fourth antenna 110n to the demodulation unit 113n, is designated as the reception system receiving the relay station broadcast of a different frequency (hereafter, the second system of reception).

The first tuning unit 112a tunes in to a signal of a predetermined frequency band from the signal received by the first antenna unit 110a connected to the connector 111a, and outputs the signal to the demodulation unit 113a. The second tuning unit 112b tunes in to a signal of the same frequency band as that of the first tuning unit 112a from the signal received by the second antenna unit 110b connected to the connector 111b, and outputs the signal to the demodulation unit 113b.

The third tuning unit 112m tunes in to a signal of a frequency band that is different from the first tuning unit 112a from the signal received by the third antenna 110m connected to the connector 111m, and outputs the signal to the demodulation unit 113m. The fourth tuning unit 112n tunes in to a signal of the same frequency band as the third tuning unit 112m from the signal received by the fourth antenna 110n connected to the connector 111n, and outputs the signal to the demodulation unit 113n.

The combining unit 114, with the combining unit 114a, performs diversity combining of the OFDM signals outputted from the demodulation units 113a and 113b. The combining unit 114, with the combining unit 114n, performs diversity combining of the signals outputted from the demodulation units 113m and 113n, and outputs the signals to the decoding units 115a and 115n.

The decoding unit 115 decodes both OFDM signals outputted from the combining units 114a and 114n, generates TS packet data, and outputs both to the TS processing unit 116.

The TS processing unit 116 adjusts the timing within the packet data outputted from the decoding units 115a and 115n, and one of the TS packet data is exchanged by packet unit, generating one TS packet data, the TS processing unit then decodes the TS packet data.

The control unit 117, using the information signal outputted from each stage, performs control between stages. The control unit 117 receives, from the demodulation unit 113, for example, broadcast quality information such as CN ratio information, TS packet error presence information, or error-corrected bit error information. The control unit 117 receives, from the decoding unit 115, for example, TS packet data quality information such as, for example, error flags included in NIT (Network Information Table) information or TS packets. Frequency location information, being sent by broadcasters, of relay stations which include master stations or MFN, is included in the NIT information, and it is possible to acquire relay station information from the NIT information.

Figure 2:
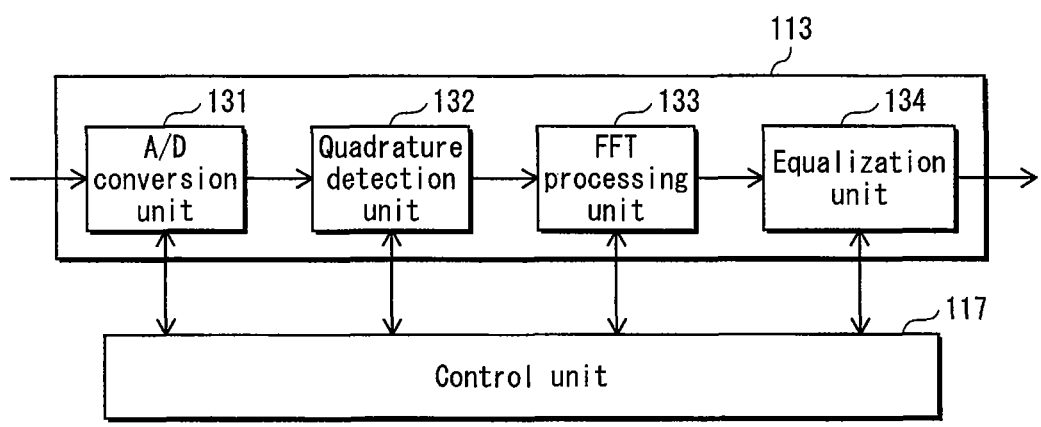
FIG. 2 is a block diagram of the demodulation unit of Embodiment 1 of the present invention.

FIG. 2 is a block diagram showing the specifics of the demodulation unit 113 (113a, 113b, 113m, 113n). The demodulation unit 113 includes an A/D conversion unit 131, a quadrature detection unit 132, an FFT calculation unit 133 and an equalization unit 134.

The A/D conversion unit 131 samples the OFDM signal outputted from the preceding tuning unit 112, and outputs the signal to the quadrature detection unit 132 after altering the signal to a digital signal.

The quadrature detection unit 132 changes the OFDM signal acquired from the A/D conversion unit 131 to a baseband OFDM signal, multiplying a sine wave of a same frequency as a standard carrier wave. The quadrature detection unit 132 then outputs the signal to the FFT calculation unit 133.

The FFT calculation unit 133 extracts a signal sequence of an effective symbol period from the OFDM signal of the baseband outputted from the quadrature detection unit 132. Then, the FFT calculation unit 133 performs a Discrete Fourier Transform on the extracted signal sequence, to generate a complex signal. The FFT calculation unit 133 then outputs the complex signal yielded by the Discrete Fourier Transform to the equalization unit 134.

The equalization unit 134 receives the complex signal from the FFT calculation unit 133. There are only as many complex signals received from the FFT calculation unit 133 as there are FFT points, and these complex signals separately make up OFDM symbol data. For example, in keeping with the operative standard known as ISDB-T broadcasting standard mode 3, the number of FFT points is 8192, with 5617 of the complex signals of the 8192 number being the target signals, known as the OFDM symbol. The OFDM symbol data includes a SP (Scattered Pilot) signal for each 12 symbols in the carrier direction. Also, in the time direction, SP signals are progressively shifted by 3 symbols. The equalization unit 134 detects and extracts SP signals from the OFDM signal. Because the SP signals are known signals, then by dividing the extracted SP signals by the known pattern signals, it is possible to calculate the channel characteristics of the transmission and receiving interval of the signal. Because the SP signals are placed discretely within the OFDM signal, the signal of the position of OFDM symbols that do not include SP signals is calculated by interpolating the channel characteristics calculated from the surrounding SP signals. By dividing each OFDM symbol by the calculated channel characteristics, an OFDM symbol for which channel influence has been compensated can be gained. The equalization unit 134 outputs, to the subsequent combining unit 114, the complex signal of the estimated result of the channel characteristics relating to the OFDM symbol and the OFDM symbol for which channel influence has been compensated.

Embodiment 1 describes the structure of one of the demodulation units 113a, 113b, 113m, and 113n that make up the demodulation unit 113. However, the present invention is not bound to this example, and it is also possible to use a structure where processing of four signals outputted from the tuner 112 is performed by one demodulation unit 113.

The combining unit 114a sequentially receives an OFDM symbol that has compensated for the channel influence, outputted from the first system of reception, and a data sequence of the estimated results of the channel characteristics. The combining units 114a, 114n perform diversity combining of the received data sequences, and output the combining results to decoding units 115.

Figure 3:
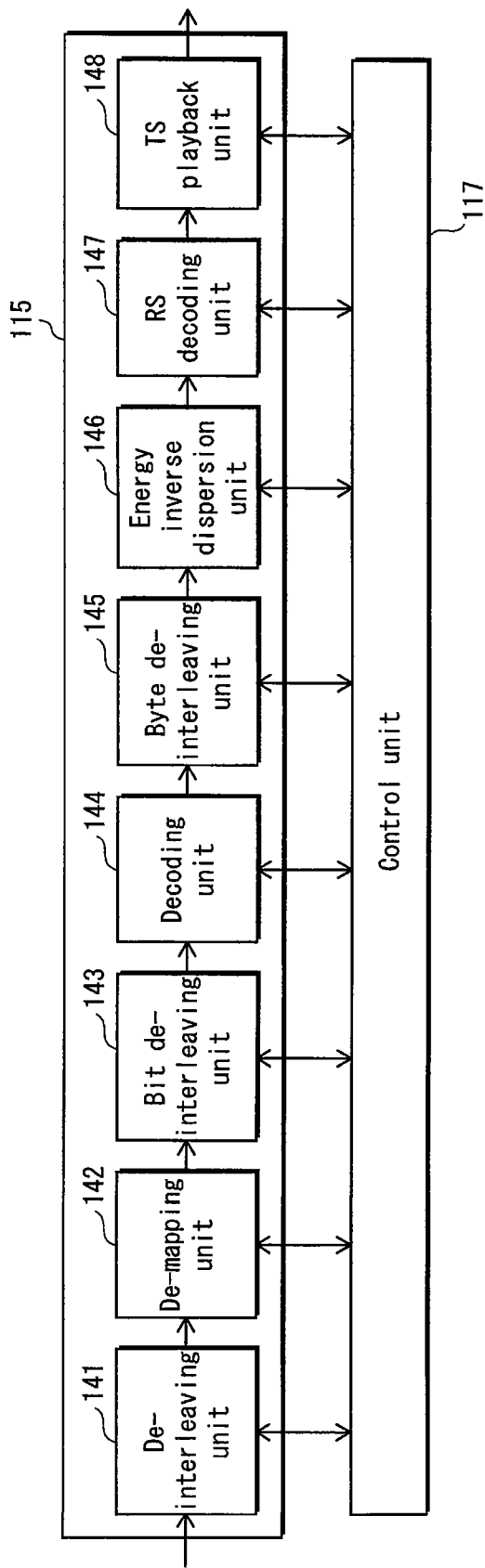
FIG. 3 is a block diagram of the decoding unit of Embodiment 1 of the present invention.

FIG. 3 is a block diagram showing the decoding unit 115 (115a, 115b, 115m, 115n). The decoding unit 115 includes a de-interleaving unit 141, a de-mapping unit 142, a bit de-interleaving unit 143, a decoding unit 144, a byte de-interleaving unit 145, an energy inverse dispersion unit 146, an RS (Reed Solomon) decoding unit 147 and a TS playback unit 148.

The de-interleaving unit 141 sequentially receives, from the combining unit 114, an OFDM symbol that has compensated for the channel influence, and a data sequence of the estimated results of the channel characteristics. Then, the de-interleaving unit 141 re-orders the received data sequences. The rules for the re-ordering are provided by the ISDB-T standard, and processing is performed to restore the signal, that has been randomly reordered with the interleave process of a sender in time direction or frequency direction, to the previous order. Then, the re-ordered OFDM symbol and data sequences of the estimated results of the channel characteristics are outputted to the mapping unit 142.

The de-mapping unit 142 receives the re-ordered OFDM symbol and data sequences of the estimated results of the channel characteristics from the de-interleaving unit 141. The OFDM symbol is mapped on a complex plane for the symbol sender, according to, a carrier modulation method. For example, if the carrier modulation method is 64QAM, then alterations are made to one of the signals of the 64 point mapping point, relating to the received bit data. The de-mapping unit 142 generates bit data with the mapping point that is closest to the received complex signal as the transmission signal point. Also, reliability information is generated based on: (i) the distance between the reception signal point and the mapping point that is taken as the transmission signal point (hereafter, the distance information of the reception symbol point), and (ii) the reliability information separately received from the de-interleaving unit 141. In this situation, the distance information of the reception signal point is accumulated for a predetermined period of time for each OFDM symbol, and reliability information may be generated from the noise volume of each carrier, the estimated result of the channel characteristics, and the distance information of the reception symbol point, after the noise volume of each carrier included in the carrier included in the OFDM signal is separately calculated. Then, the generated bit data and the reliability information is outputted as data sequences to the bit de-interleaving unit 143.

The bit de-interleaving unit 143 performs re-ordering of bit data and reliability information received from the de-mapping unit 142, to restore the order to that of the ISDB-T standard regulations, then outputting the result to the decoding unit 144.

The decoding unit 144 receives bit data and reliability information from the bit de-interleaving unit 143, and performs weighting of and viterbi decoding of the received bit data in accordance with the reliability information. The decoding unit 144 then outputs, to the byte de-interleaving unit 145, the data sequences of the results of the viterbi decoding.

The byte de-interleaving unit 145 receives the data sequences of the results of the viterbi decoding received from the decoding unit 144, and performs a re-ordering to restore the order to that of the ISDB-T standard regulations. The byte de-interleaving unit 145 then outputs the result as data sequences to the energy inverse dispersion unit 146.

The energy inverse dispersion unit 146 performs processing on the data sequences acquired from the byte de-interleaving unit 145, in order to undo the energy diffusion processing performed by the signal sender in accordance with the regulations of the ISDB-T standard, and then outputs the altered data sequences to the RS decoding unit 147.

The RS decoding unit 147 performs a reed Solomon decoding process of the data sequences received from the energy inverse dispersion unit 146, using the received attached external symbol. The RS decoding unit 147 then outputs the post-Reed Solomon-decoded data sequences to the TS playback unit 148.

The TS playback unit 148 receives the Reed Solomon decoded data sequence from the RS decoding unit 147. The Reed Solomon decoded data sequence received from the RS decoding unit 147 is the TS packets. With the TS playback unit 148, the number of TS packets gained from the RS decoding unit 147 changes by transmission parameter. Therefore, an appropriate number of null packets are supplemented, and a fixed number of TS packets may be outputted without relying on transmission parameters. The TS playback unit 148 outputs the TS packets which have been supplemented with null packets to the subsequent TS processing unit 115.

Note that this embodiment describes the structure of one of the decoding units 115a or 115n which make up the structure of the decoding unit 115. However, the present invention is not limited to this example. It is also possible to utilize a structure whereby processing of two signals outputted from the combining unit 114 is performed with one decoding unit 115.

Figure 4:
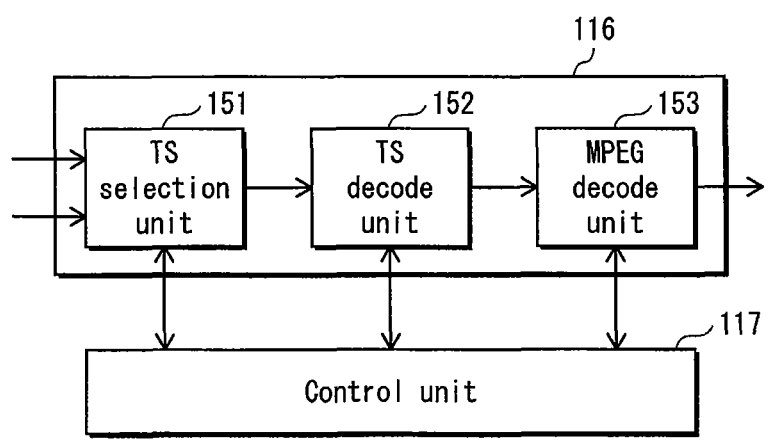
FIG. 4 is a block diagram of the TS processing unit of Embodiment 1 of the present invention.

FIG. 4 is a block diagram of the TS processing unit 116. The TS processing unit 116 includes a TS selection unit 151, a TS decode unit 152, and an MPEG decode unit 153.

The TS selection unit 151 extracts, by packet, the differential delay of (i) the first reception system TS packet data outputted from the preceding decoding unit 115, and (ii) the second reception system of TS packet data, based on the information included in the TS packet data. Then, the TS selection unit 151 corrects the data and aligns the timings of the TS packet data. Then, the TS selection unit 151 selects the TS packet data with the best reception quality for each packet, and outputs the result to the TS decode processing unit 152.

The TS decode processing unit 152 separates the TS packet data outputted from the TS selection unit 151 into packets such as a video packet, an audio packet, a PCR (Program Clock Reference) packet, etc, based on information included in the TS. The TS decode processing unit 152 then outputs the separate packets to the MPEG decode unit 153.

The MPEG decode unit 153 is made up of a video coder and an audio coder. The video coder extracts video packets from within the transport stream packets received from the TS decode unit 152, then decodes the data and creates image data. The audio coder extracts audio packets from within the transport stream packets received from the TS decode unit 152, then decodes the data and creates audio data. Then, the MPEG decode unit 153 outputs the image data and audio data to the subsequent display unit 119, after adjusting their output timings based on the time information included in the PCR packet.

In the structure shown by the above FIGS. 1 to 4, with the ISDB-T method, for areas which can receive signals sent from a plurality of relay stations, signal reliability is improved, and viewing of audio and video is possible when receiving broadcast signals made up of the same TS packet data on different frequencies.

Here, a detailed explanation will be provided for the features of the TS selection unit 151 that are different from those of the first digital broadcasting device of the digital broadcasting device 100, which pertains to embodiment 1 of the present invention.

Figure 5:
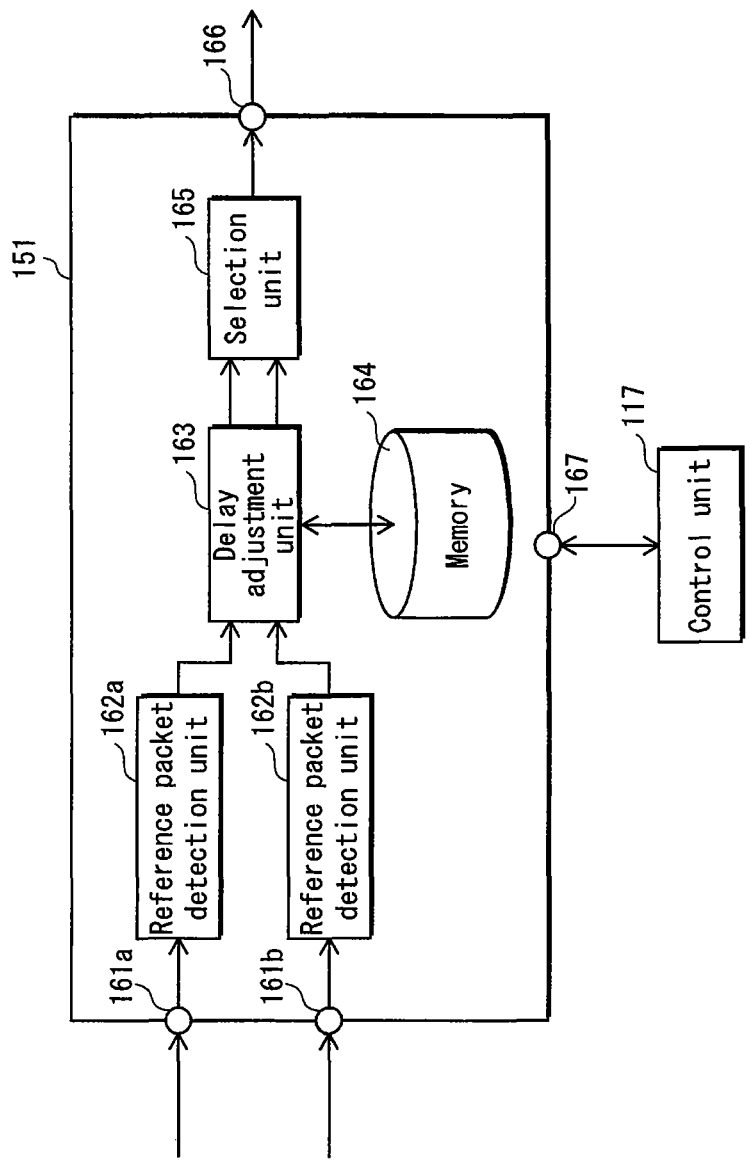
FIG. 5 is a block diagram of the TS selection unit of Embodiment 1 of the present invention.

FIG. 5 is a block diagram of the TS selection unit 151 in the TS processing unit 116 of the digital broadcasting device 100 pertaining to embodiment 1 of the present invention. Regarding FIG. 5, the TS selection unit 151 includes connectors 161a and 161b, reference packet detection units 162a and 162b, a delay adjustment unit 163, a memory 164, a selection unit 165, and connectors 166 and 167.

The connectors 161a and 161b are connected to the output from the TS playback unit 148 of the preceding decoding units 115a and 115n, and the TS selection unit 151.

The reference packet detection units 162a and 162b detect, as timing information, the TS_Sync signal, for example, that is a synchronous signal of two inputted pieces of TS packet data.

The delay adjustment unit 163 calculates, by packet unit, the receiving timing differences (TS delay compensation information) of the two pieces TS packet data, with the timing information (TS_Sync signal) from the reference packet detection units 162*a* and 162*b* as a reference. The delay adjustment unit 163 then sequentially saves to the memory 164 one packet at a time calculated from packet data. When the TS packet data timings have agreed, the packets of TS packet data previously saved to the memory 164 are sequentially read out, the timings of the two pieces of packet data are made to agree by packet unit, and outputted to the selection unit 165. The TS delay compensation information is outputted to the control unit 117 that is connected to the TS selection unit 151 by the connector 167. The control unit 117 instructs the delay adjustment unit 163 to read out the packets of the TS packet data using the TS delay compensation information as a reference.

The selection unit 165 selects one of the two pieces of TS packet data by packet unit and outputs the selection, using the reception quality information of the first and second systems of reception inputted from the control unit 117 connected by the connector 167, and the TS quality information as a reference.

The connector 166 connects the TS selection unit 151 with the subsequent TS decoder unit 152.

Next, the process of detecting the reception timing difference (TS delay compensation information) by the delay adjustment unit 163 pertaining to embodiment 1 of the present invention will be described in more detail.

As above, the delay adjustment unit 163 is able to arrange the timings between the two pieces of packets using the timing information (TS_Sync signal) from the reference packet detection units 162*a* and 162*b* as a reference. However, it is necessary that the content of the two pieces of TS packets to be arranged corresponds with each other.

For this reason, the delay adjustment unit detects whether or not the content of the two TS packets received with the two reception systems matches, adjusting the timing in advance.

NIT information (including service_id, network_id) and BIT (Broadcaster Information Table) information (including affiliation_id) is included in the two TS packets received with the two reception systems.

The delay adjustment unit 163 compares the service_id, network_id and affiliation_id for each of the two TS packets. When the comparison results show that the service_id, network_id and affiliation_id for both match, then even when receiving from different relay stations, the two TS packets can be detected as TS packets corresponding to the same channel tuning.

Then, the delay adjustment unit 163 uses the continuity_counter, included in each of the two TS packets detected to correspond to the same channel tuning, to identify the packet sequences of each TS packet.

Because the continuity_counter is normally incremented consecutively, it is possible for the two TS packets whose continuity_counters match to be considered as the same packet sequence. Then, it is possible for the receiving time differences of the two TS packets considered to be the same to be calculated as TS delay compensation information.

A more detailed example of the delay adjustment unit 163 detecting the receiving timing difference (TS delay compensation information) will be explained using FIG. 6.

Figure 6:
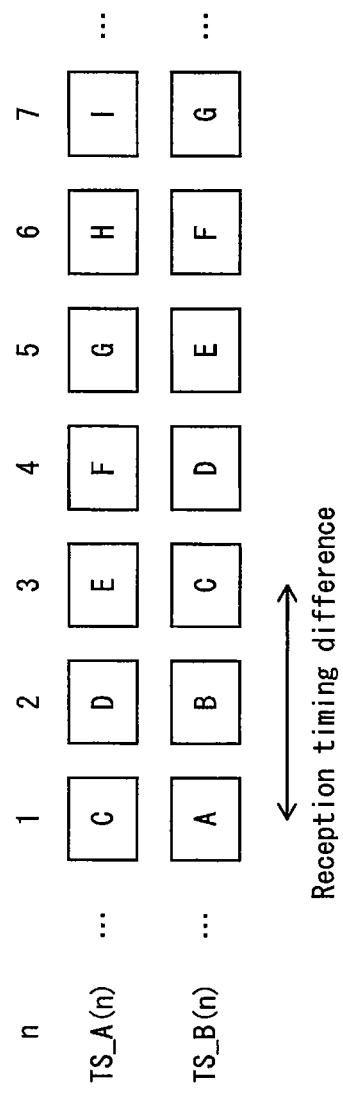
FIG. 6 is a schematic diagram showing an example of the packet sequence of the receiving two sets of TS packet data of Embodiment 1 of the present invention.

FIG. 6 is a schematic diagram showing one example of two TS packet data packet sequences that are received.

FIG. 6 shows the TS packet TS_A (n) received by the first system of reception and the TS packet TS_B (n) received by the second system of reception. The packet sequences of each are shown by A, B, C . . . and the packet units are also shown.

The two TS packets TS_A(n) and TS_B(n) have already been detected as TS packets which correspond to the same channel tuning.

For example, when n=1, then the TS packet TS_A (1) received by the first system of reception is C, and the TS packet TS_B (1) received by the second system of reception is A. When n=3, then the TS packet TS_A (3) received by the first system of reception is E, and the TS packet TS_B (3) received by the second system of reception is C. The n of TS_A (n) and the n of TS_B (n) match from number 1 for TS_A (n) and from number 3 for TS_B (n). In other words, in this case, the packet difference between TS_A (n) and TS_B (n) is two packets. From this we can understand the TS delay adjustment information, that is the reception timing difference of the TS of the first and second reception systems, to be two packets.

Therefore, the delay adjustment unit 163 detects the reception timing difference of the TS_A (n) and TS_B (n) and performs delay adjustment to make the content of the packets match by TS packet unit.

In the case of FIG. 6, because the n of TS_A (n) and the n of TS_B (n) match from number 1 for TS_A (n) and from number 3 for TS_B (n), TS_A (1) is stored in the memory 164. In the same way, when n=2 or n=3, the TS packets TS_A (2) and TS_A (3) received by the first reception system are stored in the memory 164. Next, when n=3, then the TS packet TS_A (3) received by the first system of reception is E, and the TS packet TS_B (3) received by the second system of reception is C. In this case, the TS packet TS_B (3) received by the second system of reception is C, which matches the TS packet TS_A (1) received when the first system of reception n=1. Accordingly, when n=3, the delay adjustment unit 163 reads out the TS packet TS_A (1) from the memory 164 and outputs this to the selection unit 165 along with the TS packet of the TS_B (3). The TS Packet TS_A (3) is stored in the memory 164.

Figure 7:
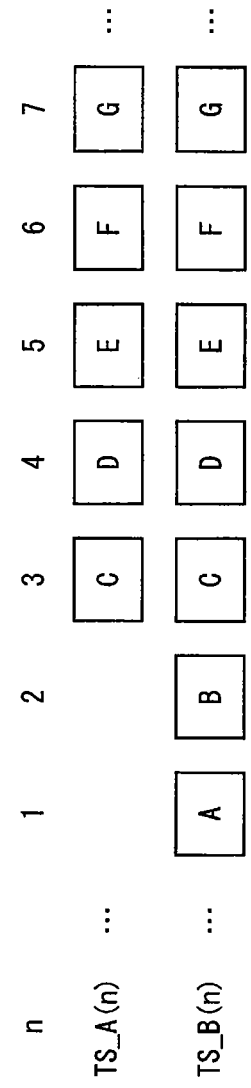
FIG. 7 is a schematic diagram showing an example of the TS packet sequence of Embodiment 1 of the present invention which has been delay adjusted by the delay adjustment processing unit and outputted to the selection processing unit.

FIG. 7 is a schematic diagram showing the packet sequences being delay-adjusted by the delay adjustment unit 163 and outputted to the selection unit 165. When n in FIG. 6 is 1, the TS packet TS_A (1) received by the first system of reception is outputted as TS_A (3), with n as number 3 in FIG. 7, due to the delay adjustment. At this point, the TS packet TS_B (3) received by the second system of reception is C, making the TS packet timings match. In the same way, when n in FIG. 6 is 2, 3, 4 or 5, the TS_A (2), TS_A (3), TS_A (4), and TS_A (5) received by the first system of reception are outputted as TS_A (4), TS_A (5), TS_A (6), and TS_A (7), with n as numbers 4, 5, 6 or 7 in FIG. 7, due to the delay adjustment. In the same way, the TS packets TS_B (4), TS_B (5), TS_B (6), and TS_B (7), are D, E, F and G, making the TS packet timings match.

In other words, when adjusting the timing of the packet sequences of the two pieces of received TS packet data, the delay adjustment unit 163 calculates the delay compensation information, and then by making the timings of the TS packet data match, it becomes possible to arrange the reception timings even for signals of different frequencies.

Figure 8:
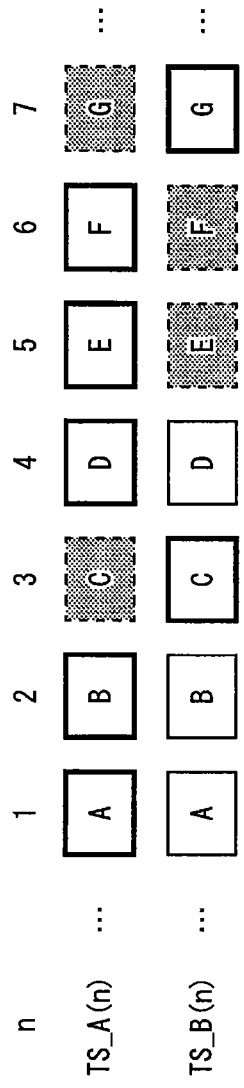
FIG. 8 is a schematic diagram of an example of the TS packet sequence to explain the selection processing unit and control unit, of Embodiment 1 of the present invention.

Next, the selection unit 165 and the control unit 117 pertaining to Embodiment 1 of the present invention will be explained using FIG. 8. In FIG. 8, the TS packet TS_A (n) received with the first system of reception and the TS packet TS_B (n) received with the second system of reception are shown, as well as the packet sequences A, B, C, G, and the packet units. When TS_A (n) is given precedence among TS packets selected by the selection unit 165, when in FIG. 8 for example, n is number one, then TS packet TS_A (1) received by the first system of reception is selected, and when n is number two, then TS packet TS_A (2) received by the first system of reception is selected. When n is number three, an error is identified in TS packet TS_A (3) received by the first system of reception using the reception quality information or TS quality information from the control unit 117 as a standard. Then, TS packet TS_B (3) received by the second system of reception is selected instead. When n is number four, the TS packet TS_A (4) received by the first system of reception is error-free. Therefore, the TS packet TS_A (4) received by the first system of reception is selected. When n is number five or six, an error is identified in TS packets TS_B (5) and TS_B (6) received by the first system of reception using the reception quality information or TS quality information from the control unit 117 as a standard. However, TS_A (n) is given priority, and therefore TS packets TS_A (5) and TS_A (6) received by the first system of processing are selected. When n is number seven, an error is identified in TS packet TS_A (7) received by the first system of reception using the reception quality information or TS quality information from the control unit 117 as a standard. Then, TS packet TS_B (7) received by the second system of reception is selected instead.

In other words, when selecting, by packet unit and in accordance with the received signal or TS packet quality, TS packets from among packet data received by two systems of reception, it is possible to provide audiovisuals using high quality TS packet data by selecting TS packets and generating TS packet data using as a standard, reception quality information or TS quality information from the control unit 117.

Also, it is possible to generate even higher quality TS packet data by aligning the timings of the packet sequences of the received two pieces of TS packet data.

Note that, TS_A (n) is given precedence among TS packets selected by the selection unit 165, but when the TS packet is error-free, then the TS packet received by that system of reception may be selected.

Figure 9:
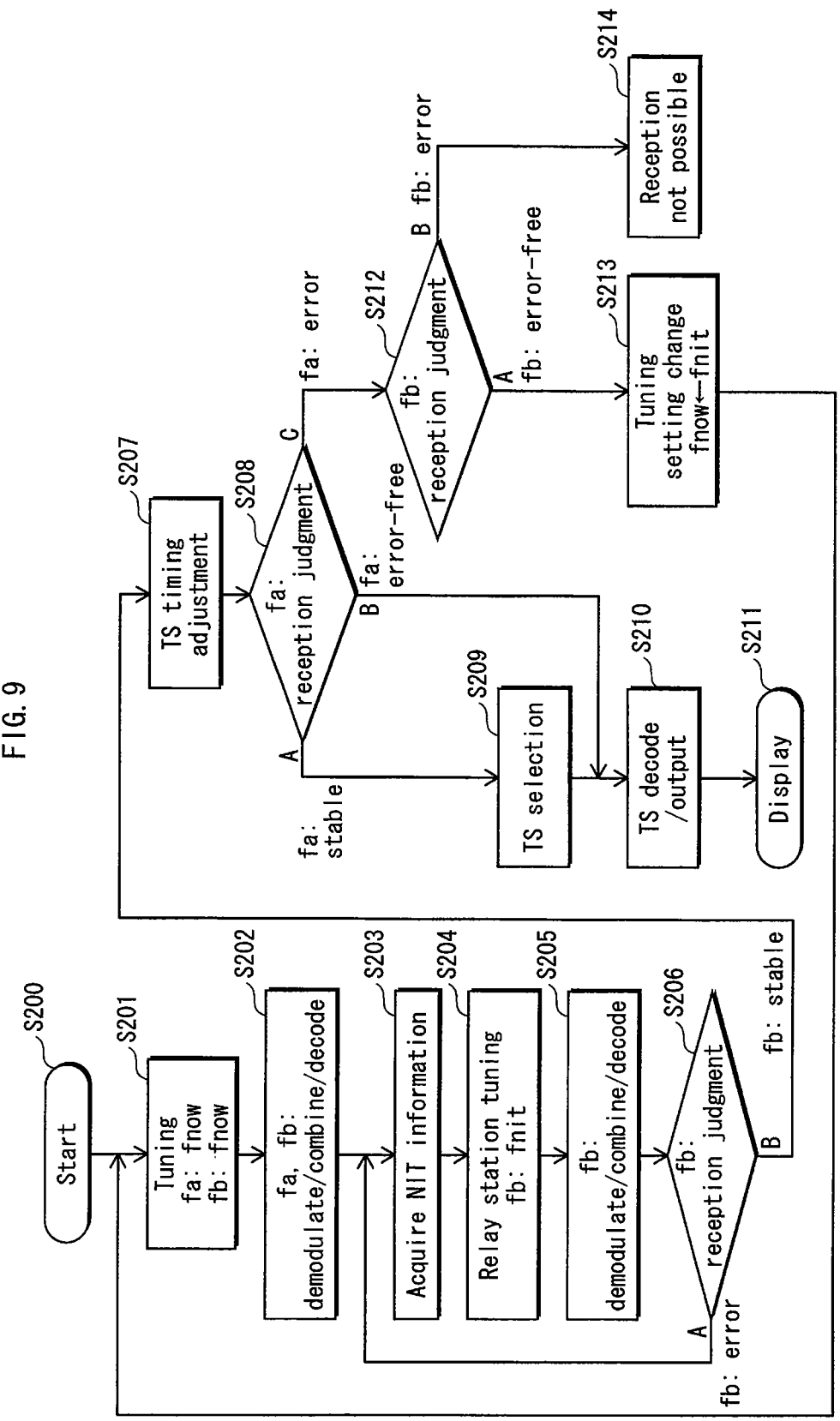
FIG. 9 is a flow chart showing one example of the operations of the digital broadcast receiver of Embodiment 1 of the present invention.

Next, an example of the operations of the digital broadcasting device 100 of FIG. 1 that pertains to Embodiment 1 of the present invention will be described using the flowchart of FIG. 9.

When the digital broadcasting device 100 is in an area where reception of the frequency fnow is possible (Step S200), then the frequency fa is designated as fnow with the tuning settings of the first system of reception, and the frequency fb is designated as fnow with the tuning settings of the second system of reception (Step S201). Demodulation, diversity combining and decode processing are performed for the first and second systems of reception (Step S202). NIT information is acquired from the information included in the TS packet data of the decoded systems of reception, for example, the TS packet data of the first system of reception, and information of a relay station that is the same as the broadcast wave of the currently viewed broadcast is extracted from the NIT information (Step S203). Using the extracted relay station information (relay station information frequency: fhit) as a standard, the second system of reception is re-tuned to the tuning settings of the relay station. In other words, the frequency fb is made the frequency fnit (Step S204). Then, the demodulation process, diversity combining and decoding process of the second system of reception is performed (Step S205), and a reception judgment of the second system of reception is carried out (Step S206).

When it is determined in Step S206 that there is an error with the reception judgment of the second system of reception (Step S206A), then Step S203 is returned to, and the process repeated from the extraction of the relay station information from the NIT information. Alternatively, when it is determined in Step S206 that the reception judgment of the second system of reception is stable (Step S206B), then adjustment of the timing of the TS packet data of the first and second systems of reception is performed (Step S207). Next, the reception judgment of the first system of reception, that is the current target of viewing, is performed (Step S208).

When it is determined in Step S208 that the first reception system is stable (Step S208A), then, using the reception quality information and TS quality information from the control unit 117 as a standard, TS packets are selected by packet unit with the selection unit 165 of the TS selection unit 151, and outputting of the TS packet data is exchanged (Step S209). The exchanged and generated TS packet data is decoded (Step S210), and outputted to the display unit (Step S211). When it is determined in Step S208 that the first system of reception is error-free (Step S208B), then the TS packet data of the first system of reception is decoded (Step S210), and outputted to the display unit (Step S211). Also, when it is decided in Step S208 that there is an error with the first system of reception (Step S208C), then reception judgment of the second system of reception is performed (Step S212).

When it is determined in Step S212 that the second system of reception is error-free (Step S212A), the frequency fa is made to be fait (frit becomes fnow) with the tuning settings of the first system of reception that is the viewing target, and the process returns to Step S201. However, when it is determined in Step S212 that the second system of reception has an error (Step S212B), a judgment is made that reception is not possible (Step S214). Due to this, converting to a strong reception level or altering the number of antenna branches used in the reception system becomes necessary.

Note that the stability shown as the reception judgment result in Step S206 and Step S208 does not mean, for example, that the signal quality was error-free within a predetermined time frame, but had a reception quality that included a permissible fixed error volume.

Figure 10:
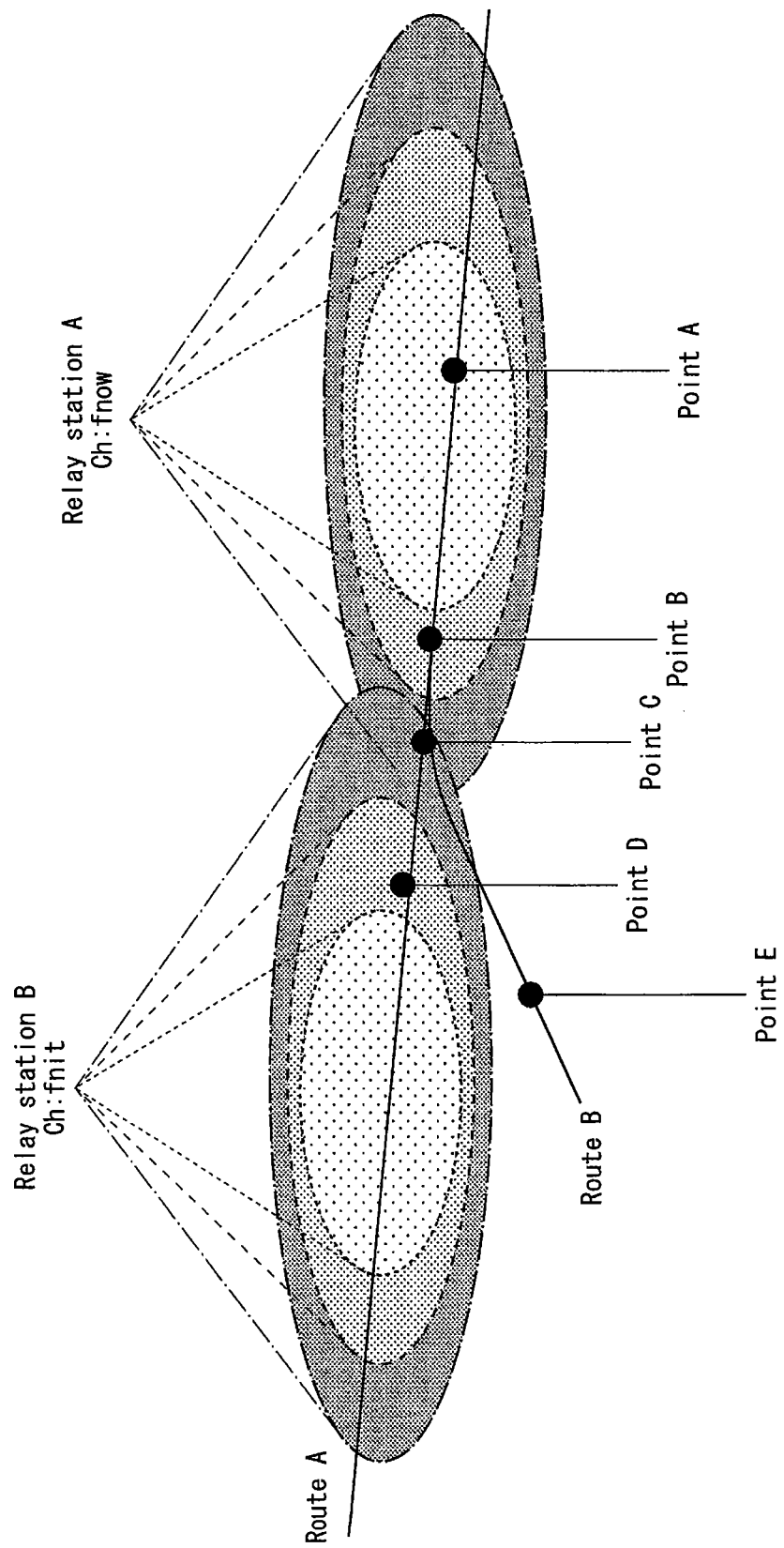
FIG. 10 is a schematic diagram of a visualization of the reception areas of the MFN environment relay stations and the routes of the moving body, of Embodiment 1 of the present invention.

FIG. 10 is a schematic diagram showing the reception on a relay station reception area and the route of the moving vehicle, when broadcast signals made up of the same TS packet data are received at the same time with different frequencies, for each area which can receive signals sent from a plurality of relay stations. When the receiver proceeds on route A from point A to point D, Point A is a reception area which can receive broadcast waves on a weak layer (full-seg) from relay station A, however, it cannot receive broadcast waves from relay station B. The receiver extracts NIT information from the relay station A broadcast waves, acquiring relay station information (broadcast frequency information of relay station B). Using the relay station information as a standard, the tuning frequencies of the two systems of reception are set, and a relay station search is performed. Accordingly it is possible to receive broadcast waves from relay station A and view the broadcast at point A.

Next, point B is in an area where the frequency waves of relay station A are receivable with diversity combining using the first system of reception. Also, the frequency waves of relay station B are receivable only on a strong layer (one-seg) with diversity combining using the second system of reception. The receiver is able to judge when the frequency, that is the target of the NIT information extracted from the broadcast waves of relay station A, is present in the frequency of relay station B. Accordingly, at point B, it is possible to view the broadcast by performing diversity combining using the first system of reception on the broadcast waves of relay station A. Also, it is possible for the frequency of relay station B to be disclosed in the NIT information of relay station A.

Point C is in an area where non-error-free reception is possible by performing diversity combining on the broadcast waves of relay station A using the first system of reception. Also, Point C is in an area where non-error-free reception is possible by performing diversity combining on the broadcast waves of relay station B using the second system of reception. The receiver performs selection of the TS packet data using the TS packet data of the first and second systems of reception, and generates TS packet data that has no errors. Accordingly, at point C, it is possible to view the broadcast using the TS packet data generated from the broadcast waves of relay stations A and B.

Point D is in an area where frequency waves of relay station A are receivable only on a strong layer (one-seg) with diversity combining using the first system of reception. Also, it is an area where frequency waves of relay station B are receivable with diversity combining using the second system of reception. The receiver is able to judge, from the state of the two systems of reception, when the relay station that is the viewing target changes from relay station A to relay station B. Accordingly, it is possible to receive broadcast waves from relay station B at point D with diversity combining using the second system of reception. Also, broadcast waves are received from relay station A with diversity combining using the first system of reception. After this, when the reception judgment fully indicates an error, the receiver sets the selection of the first system of reception to relay station B, acquires NIT information from relay station B, and performs a search for the next relay station.

Continuing along route B leads to point E. Point E is away from the area where relay station A and B can be received, and will result in a reception error. Accordingly, converting to a strong reception level or altering the number of antenna branches used in the reception system becomes necessary.

Figure 11:
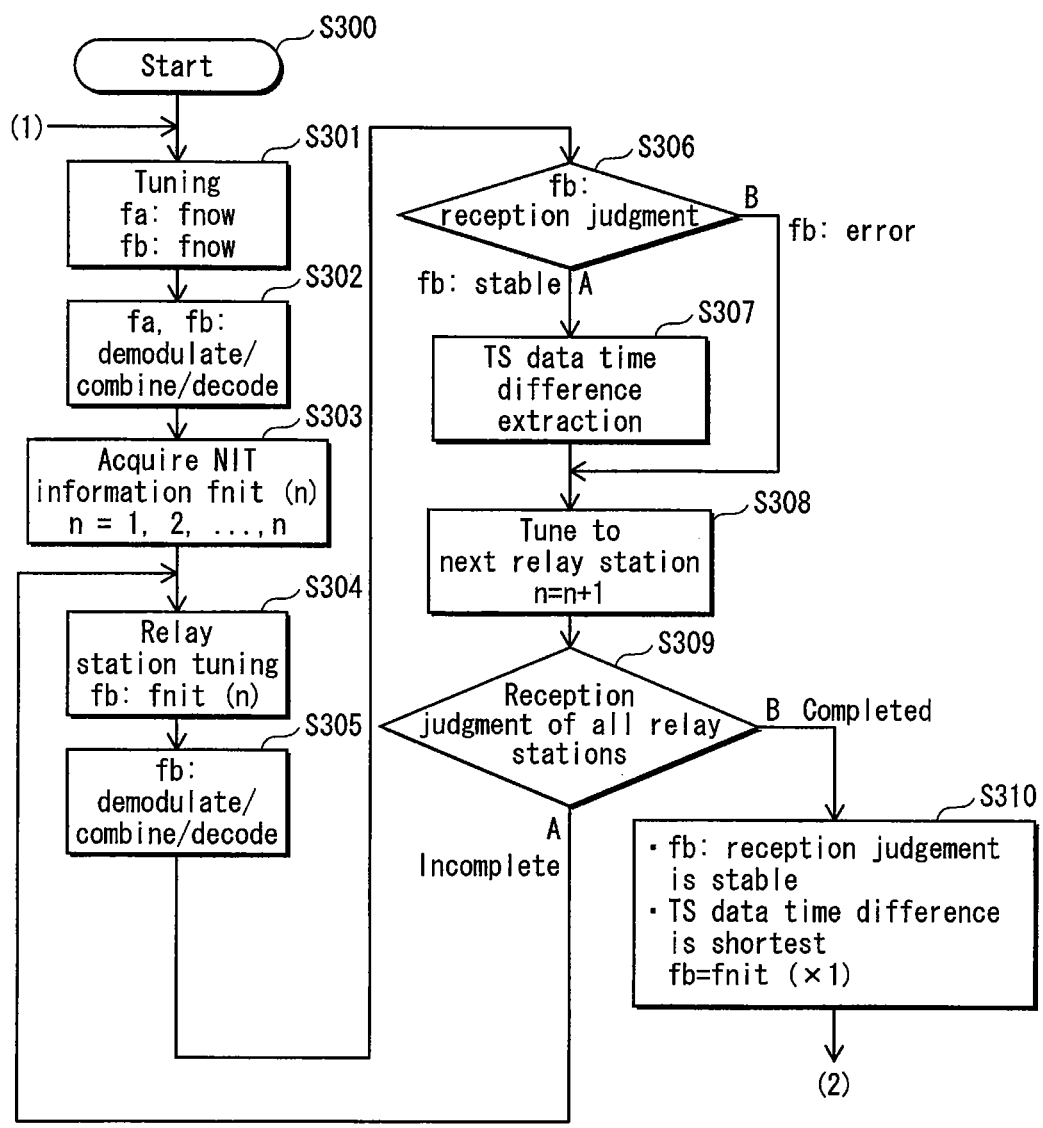
FIG. 11 is a flow chart showing one example of the operations of the digital broadcast receiver of Embodiment 1 of the present invention.
Figure 12:
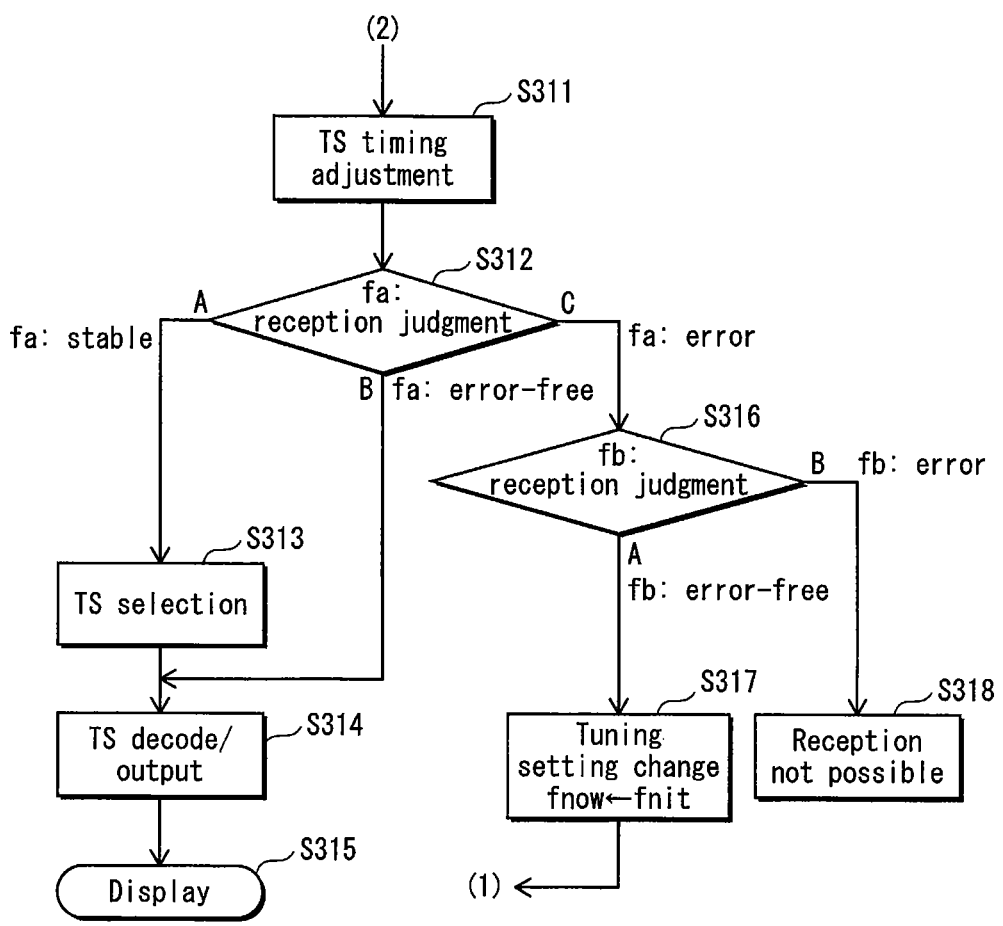
FIG. 12 is a flow chart showing one example of the operations of the digital broadcast receiver of Embodiment 1 of the present invention.

Next, an example of the operations of the digital broadcasting device 100, of FIG. 1 that pertains to Embodiment 1 of the present invention, when there are a plurality of relay stations, will be described using the flowcharts of FIGS. 11 and 12.

When located in an area where reception of the frequency fnow is possible (Step S300), the digital broadcast receiver 100 makes the frequency fa into fnow with the tuning setting of the first system of reception, and makes the frequency fb into fnow with the tuning setting of the second system of reception (Step S301). Demodulation, diversity combining and decoding are performed for the first and second systems of reception (Step S302). NIT information is acquired from the information included in the TS packet data of a decoded system of reception, for example, the first system of reception. Then, from the NIT information, relay station information is extracted that is the same as that of the broadcast waves of the broadcast currently being viewed (Step S303). Here, when there is a plurality of relay station information extracted, (relay station frequency: fnit (n), n=1, 2, . . . , n), the frequency fb is tuned to the relay station fnit (1) that was first detected, with the tuning settings of the second system of reception (Step S304). Demodulation, diversity combining and decoding is performed (Step S305), and reception judgment of the second system of reception is performed (Step S306). When the reception judgment of the second system of reception in Step S306 is that the second system of reception is stable, (Step S306A), the time difference in TS packet data between the first and second systems of reception is extracted (Step S307). Alternatively, when the reception judgment of the second system of reception in Step S306 is that the second system of reception has an error (Step S306B), the next relay station is selected (Step S308), and re-tuning, demodulation, diversity combining and decoding processes are performed.

When reception judgments have been made for all of the relay stations (Step S309B), then the relay station with TS packet data that is judged to be stable and has the shortest time difference is tuned in to (Step S310). Next, timing adjustment is performed for the TS packet data of the first system of reception and the tuned-to second system of reception (Step S311). Then, reception judgment of the first system of reception, that is currently the target of viewing, is performed, and when it has been judged that the first system of reception is error-free (Step S312B), the TS packet data of the first system of reception is decoded (Step S314), and the result outputted to the display unit (Step S315). When the first system of reception is judged to be stable (Step S312A), then, using the reception quality information or TS quality information from the control unit 117 as a standard, TS packets are selected by packet unit with the selection unit 165 of the TS selection unit 151. Then, the TS packet data output is exchanged (Step S313). The exchanged and generated TS packet data is decoded (Step S314), and outputted to the display unit (Step S315). Also, when the first system of reception is judged to contain an error (Step S312C), a reception judgment of the second system of reception is performed. When it is judged that the second system of reception is error-free (Step S316A), then the frequency fa is made to be fnit (fnow is fnit) with the tuning settings of the first system of reception that is the viewing target (Step S317), and the process returns to Step S301. Also, when it is judged that the second system of reception has an error (Step S316B), then, reception is not possible (Step S318) and for this reason exchanging to a strong reception level or altering the number of antenna branches used in the reception system becomes necessary.

Note that the stability shown as the reception judgment result in Step S306 and Step S312 does not mean, for example, that the signal quality was error-free within a predetermined time frame, but had a reception quality that included a permissible fixed error volume.

Note that, when a plurality of relay station information is extracted from the NIT information, a stable relay station that has been judged to be so by the reception judgment result will be the target in Step S310. Moreover, by tuning to the relay station with the shortest TS delay compensation information, it is possible to suppress the memory volume, needed when adjusting the delay time of the TS packet data, to the lowest limit.

Note that when there is a large amount of TS delay compensation information, for example, when layer transferring with ISDB-T broadcast standards, and there is a large amount of TS delay compensation information, time adjustment may be performed only in regards to broadcast waves which are receivable with a weak electronic field (one-seg broadcasting).

Note that confirmation may be carried out, among the TS packet data gained with the first or second systems of reception, of whether or not the TS packet data of each layer broadcast has the same content.

Note that in this example, the relay station with the shortest TS delay compensation information is given priority, and tuned in to, however, it is also possible to prioritize the reception quality information or the TS quality information. Also, the limitations of the TS delay compensation information may be decided in response to the circuit scale.

In Embodiment 1 of the present invention, reception for audiovisual use and relay detection reception were performed with a first system of reception made with two antenna, and a second system of reception made with two antenna. However, the number of antennae for each system of reception might be allocated differently than 2:2, i.e. 3:1 or 1:3, corresponding to the reception quality information or TS quality information.

Figure 13:
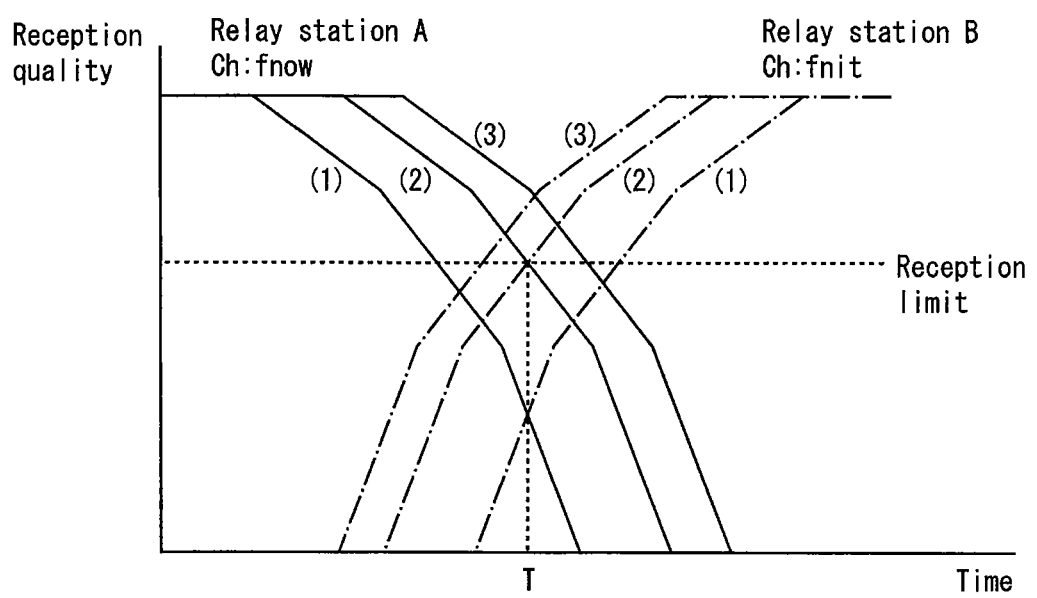
FIG. 13 is a schematic diagram showing one example of the antenna division of the digital broadcast receiver of Embodiment 1 of the present invention.

For example, FIG. 13 shows one example of an allocation of reception system antennae and reception quality information. In the diagram, the vertical axis shows reception performance quality, and the horizontal access shows the passage of time as the receiver moves from relay station A to relay station B. The solid lines show the reception performance quality when receiving from relay station A with multiple antennae. The broken lines show the reception performance quality when receiving from relay station B with multiple antennae. On the diagram, (1) shows reception using one antenna, (2) shows reception using two antennae and (3) shows reception using three antennae. When the relay station A currently receiving is able to receive with one antenna with no errors, three antennae are used to search for or receive relay station B. When it is difficult to use one antenna to receive the relay station A, then two antennae may be used, and the number of antennae allocated to the relay station B changed to two. Because at point T, the reception qualities of relay stations A and B interchange, the number of antennae to receive relay station A goes from two antennae to one antenna, and the number of antennae to receive relay station B goes from two antennae to three antennae. In other words, by allocating the number of antennae to each system of reception in response to reception quality, high-quality TS packets are generated, and the exchanging of high-precision TS packets is possible. Also, when a plurality of relay stations are detected, then by performing allocation of antennae taking into account TS delay compensation information, even higher quality TS packet data is generated, and the possibility of exchanging of high-precision TS packets becomes greater.

Note that, in this embodiment, by using affiliated stations detected from BIT information, TS conversion using TS packet data affiliated with different regions is possible.

Figure 14:
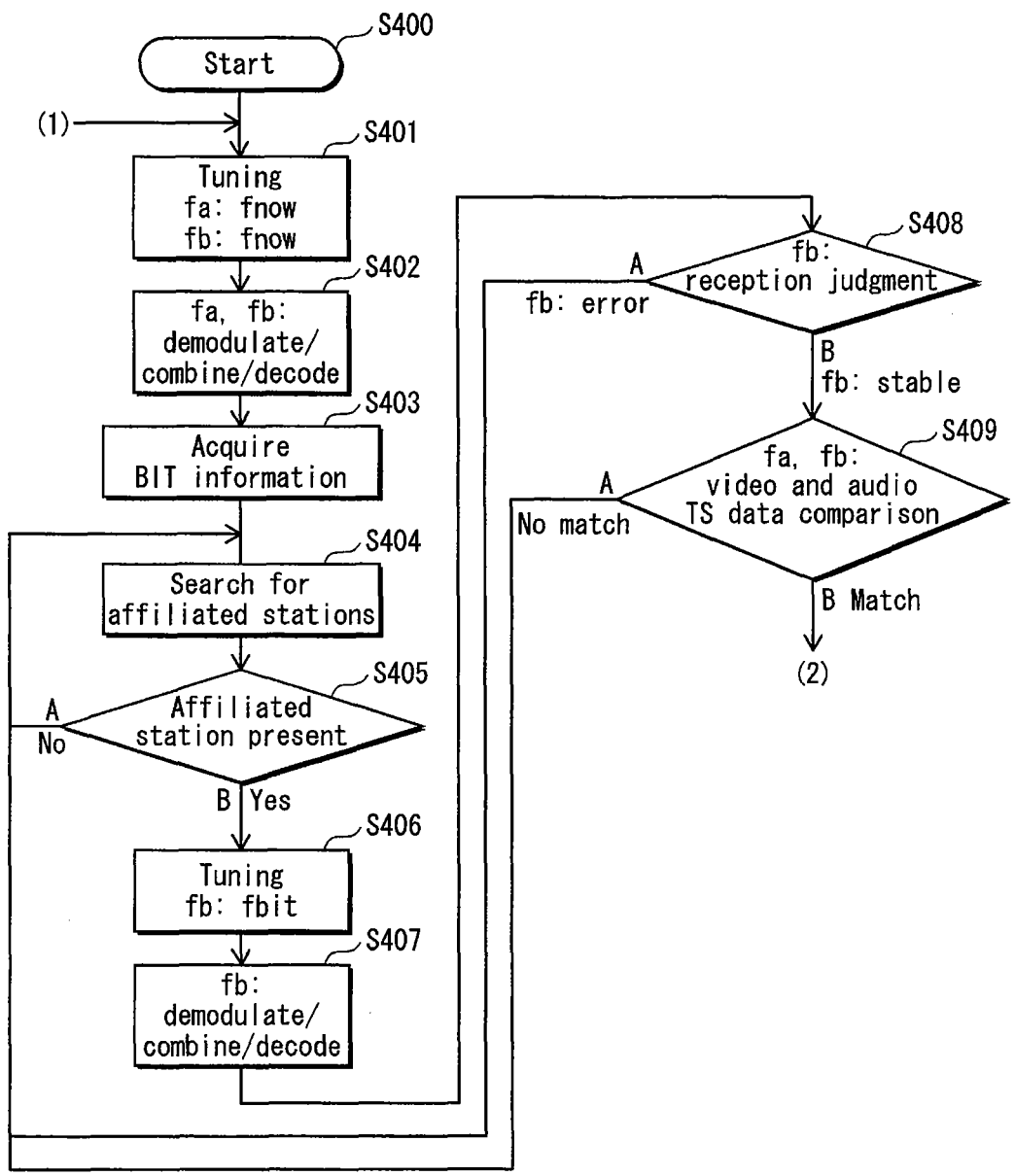
FIG. 14 is a flow chart showing one example of the operations of the digital broadcast receiver of Embodiment 1 of the present invention.
Figure 15:
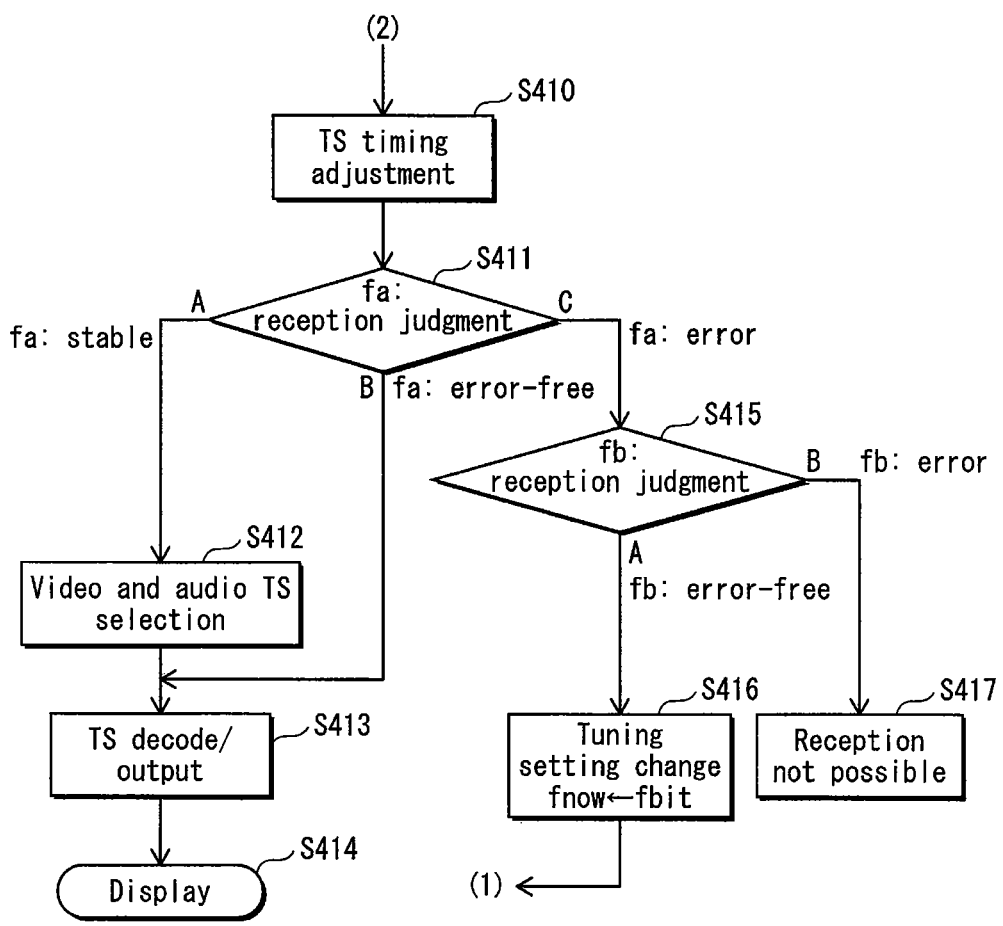
FIG. 15 is a flow chart showing one example of the operations of the digital broadcast receiver of Embodiment 1 of the present invention.

For example, FIGS. 14 and 15 show a flowchart for an example of the selection operation of TS packet data which uses affiliated stations.

When located in an area where reception of the frequency fnow is possible (Step S400), the digital broadcast receiver 100 makes the frequency fa into fnow with the tuning setting of the first system of reception, and makes the frequency fb into fnow with the tuning setting of the second system of reception (Step S401). Demodulation, diversity combining and decoding are performed for the first and second systems of reception (Step S402). BIT information is acquired from the information included in the TS packet data of a decoded system of reception, for example, the first system of reception. Then, from the BIT information, affiliated station information is extracted that is the same as that of the broadcast waves of the broadcast currently being viewed (Step S403). Using the extracted affiliated station information as a standard, searching is performed to find frequencies which have the same affiliated station information (Step S404). When there are no frequencies which have the same affiliated station information (Step S405A), the affiliated station search is repeated.

When there exist frequencies which have the same affiliated station information (Step S405B), the frequency fb is made to be fbit (Step S406), and demodulation, diversity combining and decoding is performed (Step S407). When the reception judgment of the second system of reception is that there is an error (Step S408), the BIT information is confirmed, and a search for affiliated stations is implemented again. Alternatively, when the reception judgment is "stable" (Step S408B), the image sections and sound sections are indicated and extracted by PID from among the TS packet data included in the first system of reception. In the same way, the image sections and sound sections are indicated and extracted by PID from among the TS packet data included in the second system of reception. The TS packet data for the image sections and the TS packet data for the sound sections of both are compared, and when the data does not match (Step S409A), the BIT information is confirmed, and a search for affiliated stations is repeated. Alternatively, when the data matches (Step S409B), timing adjustment is performed on the TS packet data so that the image and sound TS packet data of both is made to match (Step S410).

Next, reception judgment is performed on the first system of reception that is the current target of viewing, and when the judgment is that the first system of reception is error-free (Step S411B), a decode process is performed on the TS packet data of the first system of reception (Step S413), with the result being outputted to the display unit (Step S414). When the judgment of the first system of reception is that it is stable (Step S411A), then, using the reception quality information or the TS quality information from the control unit 117 as a standard, the TS packets of the image sections and sound sections and are selected by unit with the selection unit 165 of the TS selection unit 151, converting the output of the TS packet data (Step S412). The converted and generated TS packet data is decoded (Step S413), and the result is outputted to the display unit (Step S414). Also, when the judgment of the first system of reception is that the system has an error (Step S411C), then reception judgment of the second system of reception is performed (Step S415). When it is judged in Step S415 with the reception judgment that the second system of reception is error-free (Step S415A), the frequency fa is made to be fbit (fnow is fbit) with the tuning settings of the first system of reception that is the viewing target, and the process returns to Step S401. Also, when the judgment of the second system of reception is that the system has an error (Step S415B), then reception is not possible (Step S417). Due to this, converting to a strong reception level or altering the number of antenna branches used in the reception system becomes necessary.

Note that the stability shown as the reception judgment result in Step S408 and Step S411 does not mean, for example, that the signal quality was error-free within a predetermined time frame, but had a reception quality that included a permissible fixed error volume.

When a plurality of affiliated stations (for example an out of jurisdiction relay station with the same BIT information) is extracted from the affiliated station search, the reception judgment of the relay station that is the target will be "stable". Moreover, by tuning in to a relay station with the shortest TS delay compensation information, it is possible to suppress the memory volume, needed when adjusting the delay time of the TS packet data, to the lowest limit. With this invention, by detecting the time difference for both types of TS packet data when receiving, at the same time, broadcast signals made up of the same TS packet data from a plurality of relay stations for each area, it is possible to arrange the timings of the TS packet data, and by converting by packet unit, one of the TS packet data that has the best reception quality, it is possible to realize a digital broadcasting device 100 with few interruptions to image or sound.

Embodiment 2

Figure 16:
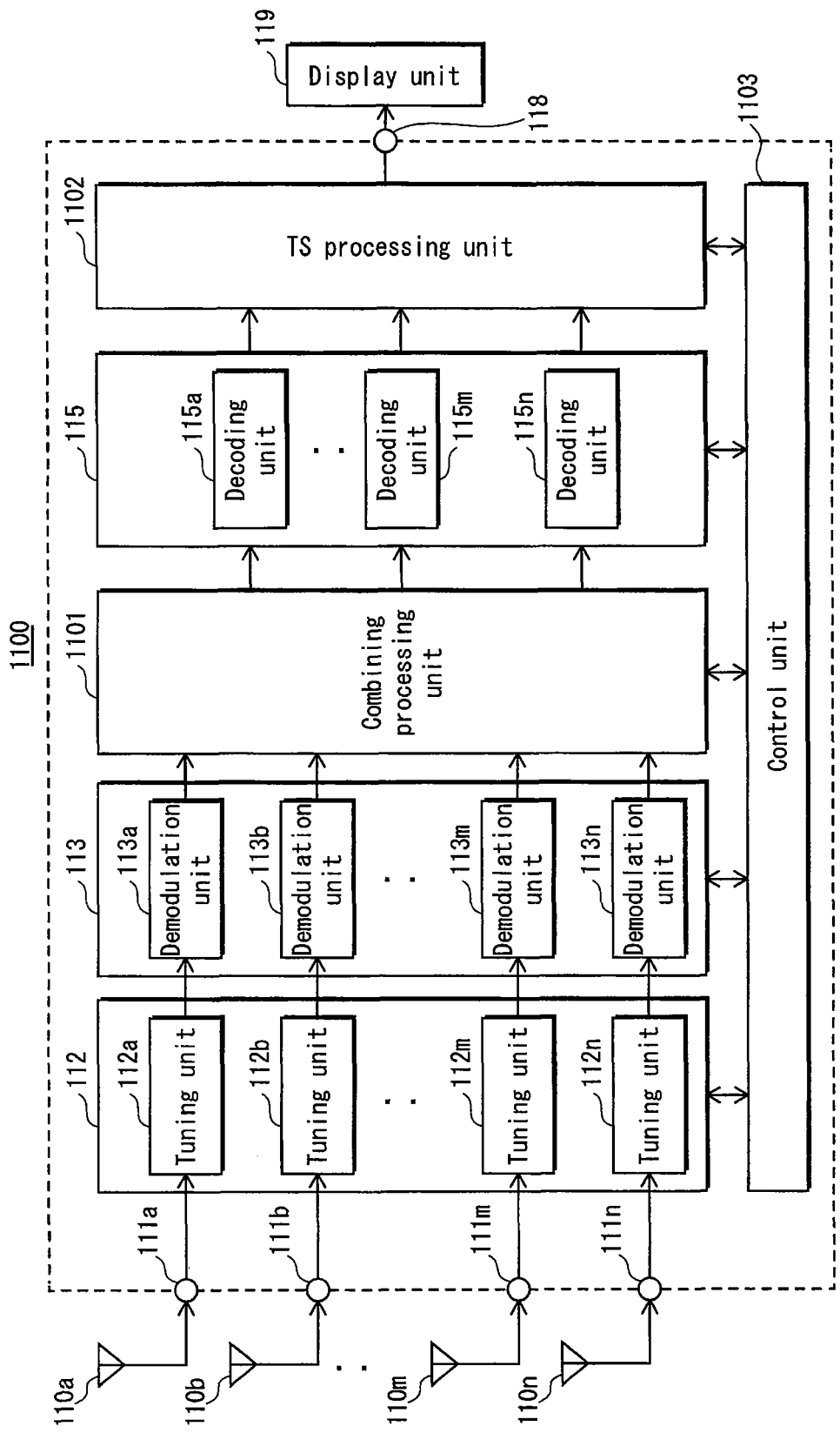
FIG. 16 a block diagram of the digital broadcast receiver of Embodiment 2 of the present invention.

FIG. 16 is a block diagram showing a digital broadcast receiver pertaining to Embodiment 2 of the present invention. The explanation of FIG. 16 will use the same numbers for the same structural elements as FIGS. 1 to 3.

Here, using as an example two systems of reception using four antennae, in order to receive the signal currently being received and a broadcast wave sent by a relay station sending TS packets which are the same as the signal currently being received but with a different frequency (physical channel), the processing system from the first antenna 110a to the demodulation unit 113a and from the second antenna 110b to the demodulation unit 113b is designated as the system of reception currently receiving broadcast (hereafter, the first system of reception), and the processing system from the third antenna 110m to the demodulation unit 113m and from the fourth antenna 110n to the demodulation unit 113n is designated as the system of reception receiving relay station broadcast on a different frequency (hereafter, the second system of reception).

Figure 18:
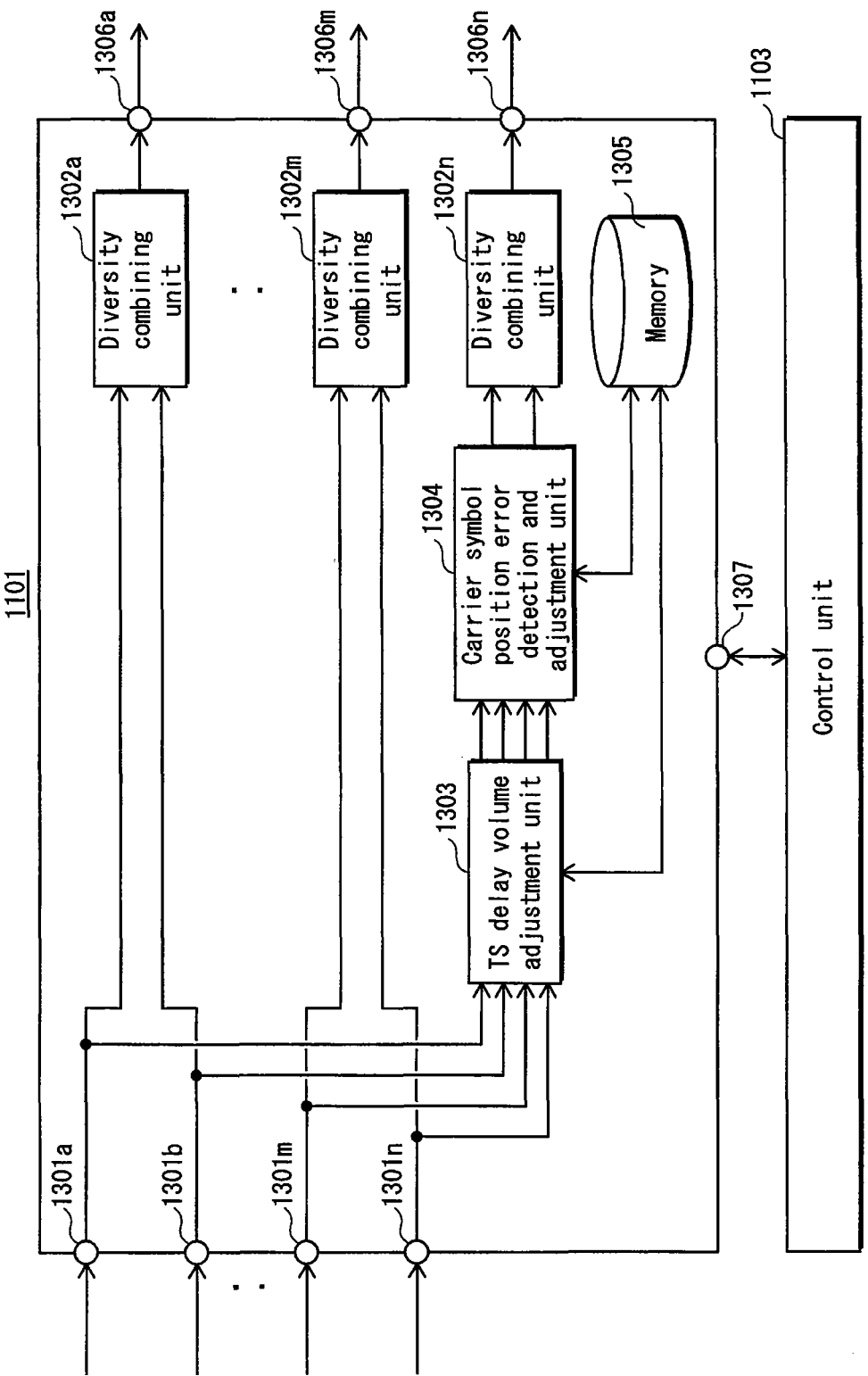
FIG. 18 is a block diagram of the combining unit of Embodiment 2 of the present invention.

The combining processing unit 110 performs diversity combining processing of the OFDM signal outputted from demodulation unit 113a and 113b with the diversity combining unit 1302a (refer to FIG. 18). In the same way, diversity combining processing is performed for the signals outputted from demodulation units 113m and 113n with the diversity combining unit 1302m (refer to FIG. 18), and the results outputted to decoding units 115a, 115m and 115n.

Also, the combining processing unit 1101 acquires TS delay adjustment information outputted by the TS processing unit 1102 from the control unit 1103, and adjusts the delay times of the OFDM signal of the first system of reception outputted by the demodulation units 113a and 113b along with the OFDM signal of the second system of reception outputted by the demodulation units 113m and 113n. Then, the combining processing unit 1101 further detects the location difference of the carrier symbol of the adjusted OFDM signal and performs adjustment, aligning the timing with the timing of the carrier symbol of the OFDM signal outputted from the demodulation units 113a, 113b, 113m and 113n. The combining processing unit 1101 then uses the aligned OFDM signals to perform diversity combining and output the result to the decoding unit 115n. Note that the method for adjusting the delay times of the OFDM signals with the combining processing unit 1101 will be discussed later.

The decoding unit 115 decodes the OFDM signal outputted from the combining processing unit 1101, creates TS packet data, and outputs these packet data to the TS processing unit 1102.

The TS processing unit 1102 detects the delay time difference between the TS packet data outputted from the decoding units 115a and 115m. The TS processing unit 1102 calculates the delay time difference between the TS packet data in terms of the OFDM frame length. For example, it should be determined whether or not the delay time difference is less than the length of one OFDM frame, to align the timings and perform combining processing with the combining processing unit if the delay time difference is less than one OFDM frame length. Also, the TS delay adjustment information is fed back to the combining processing unit by way of the control unit 1103. Also, the TS processing unit 1102 decodes the TS packet data outputted from the decoding unit 115m, and, after MPEG decoding, outputs the result to the display unit 119.

The control unit 1103 performs control between each stage using the information signal outputted from each stage. The control unit 1103 acquires reception quality information such as CN or reception error information or bit error information from the demodulation unit 113. The control unit 1103 also acquires, from the decoding unit 115, TS quality information such as NIT information or error flags included in TS packets. NIT information includes frequency location information for relay stations including master stations sent from broadcasters or MFN, etc, and it is possible to acquire relay station information from NIT information. Also, the control unit 1103 receives inter-TS delay time difference information and the MFN relay station frequency for the delay time difference, from the TS processing unit 1102.

Figure 17:
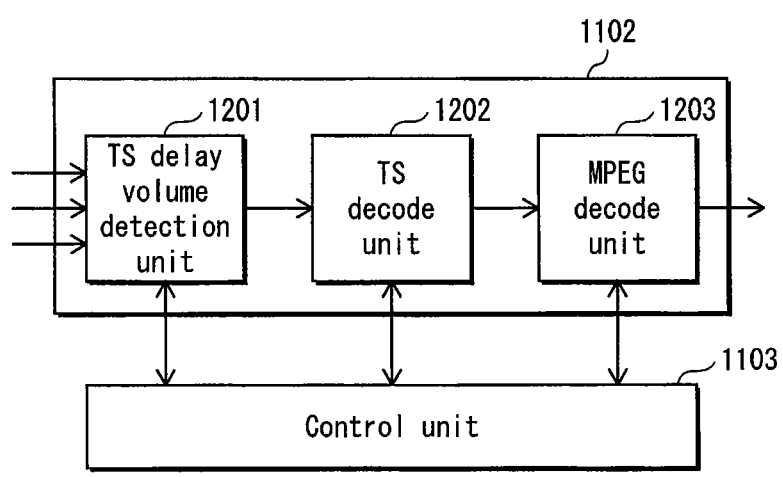
FIG. 17 is a block diagram of the TS processing unit of Embodiment 2 of the present invention.

FIG. 17 is a block diagram of the TS processing unit 1102. The TS processing unit 1102 includes a TS delay volume detection unit 1201, a TS decoding unit 1202 and an MPEG decoding unit 1203.

The TS delay volume detection unit 1201 detects from the TS packet data outputted by the preceding decoding unit 115, by packet, and using as a basis the information included in the TS packet data, the delay difference of TS packet data resulting from error. The TS delay volume detection unit 1201 then outputs the result as TS delay adjustment information to the control unit 1103.

The TS decoding unit 1202 categorizes the TS packet data outputted from the TS delay volume detection unit 1201 into video packets, audio packets, and PCR (Program Clock Reference) packets based on the information included in the TS, and outputs the packets to the MPEG decoding unit 1203.

The MPEG decoding unit 1203 includes a video decoder and audio decoder. The video decoder extracts video packets from among the transport stream packets acquired from the TS decoding unit 1202, decodes the data and creates image data. The audio decoder extracts audio packets from among the transport stream packets acquired from the TS decoding unit 1202, and decodes the data to generate audio data. Then, the MPEG decoding unit 1203, after adjusting the output timings of the image data and audio data based on the time information included in the PCR packet, outputs the image and audio data to the display unit 119 to which it is connected by the connector 118 of the preceding stage.

With the structure shown in the above FIGS. 2 to 3, FIG. 16 and FIG. 17, with the ISDB-T method, it is possible, after receiving the frequency of different relay stations in an MFN environment, to improve reception quality and receive video and sound as a result of having performed various processes.

The digital broadcast receiver 1100 of Embodiment 2 of the present invention includes the TS delay volume detection unit 1201 and the combining processing unit 1101, and in this respect differs from conventional digital broadcast receivers. Therefore, the TS delay volume detection unit 1201 and the combining processing unit 1101 will now be described in detail.

FIG. 18 is a block diagram of the combining processing unit 1101 of the digital broadcast receiver pertaining to Embodiment 2 of the present invention. In FIG. 18, the combining processing unit 1101 includes connectors 1301a, 1301b, 1301m, and 1301n, diversity combining units 1302a, 1302m, 1302n, a TS delay volume adjustment unit 1303, a carrier symbol location error detection and adjustment unit 1304, a memory 1305, and connectors 1306a, 1306m, 1306n and 1307.

The connectors 1301a, 1301b, 1301m and 1301n connect the output from the demodulation units 113a, 113b, 113m and 113n to the processing unit 1101.

The diversity combining unit 1302a performs diversity combining for the OFDM signal outputted from the demodulation units 113a and 113b that are the first system of reception, and the diversity combining unit 1302m performs diversity combining for the OFDM signal outputted from the demodulation units 113m and 113n that are the second system of reception. The diversity combining unit 1302a and the diversity combining unit 1302m then output the results to the decoding unit 115 which is connected by connectors 1306a and 1306m respectively.

The TS delay volume adjustment unit 1303 acquires the TS delay adjustment information outputted by the TS processing unit 1102 from the control unit 1103. Then, the TS delay volume adjustment unit 1303 performs adjustment of the TS packet data delay volume using the memory 1305, based on the TS delay adjustment information, for the OFDM signal of the first system of reception inputted by the connectors 1301a and 1301b, and for the OFDM signal of the second system of reception inputted by the connectors 1301m and 1301n. With this, errors between the symbols of both OFDM signals are adjusted within the scope of one frame.

The carrier symbol location error detection and adjustment unit 1304 detects the location errors of the carrier and symbol for the OFDM signal adjusted with the TS delay volume adjustment unit, and adjusts the result using the memory 1305. With this, all of the carrier symbols of the OFDM signal are aligned.

The diversity combining unit 1302n performs diversity combining for the OFDM signal adjusted according to the carrier symbol location error detection and adjustment unit 1304, and outputs the result to the decoding unit 115 which is connected with the connector 1306n.

Figure 19:
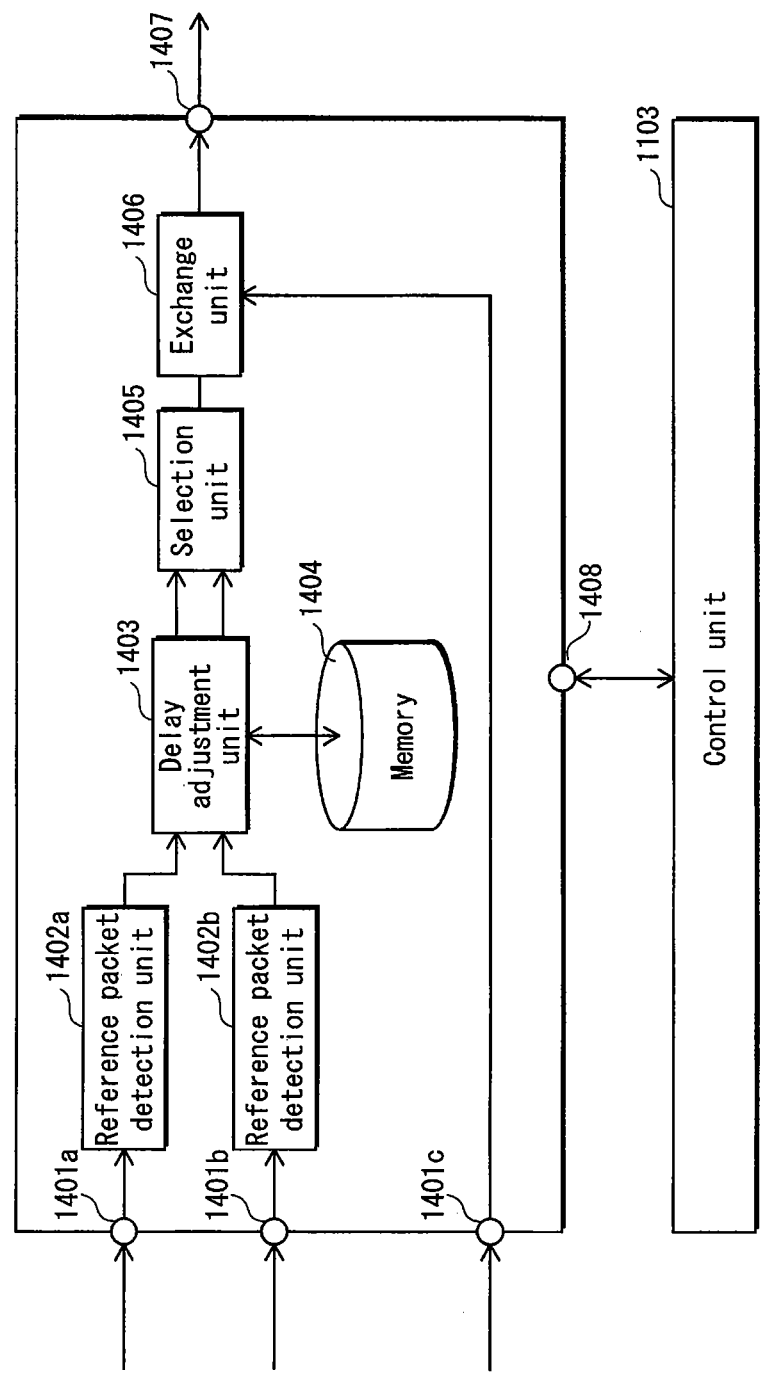
FIG. 19 is a block diagram of the delay quantity detection unit of Embodiment 2 of the present invention.

FIG. 19 is a block diagram of the TS delay volume detection unit 1201 of the digital broadcast receiver pertaining to Embodiment 2 of the present invention. In FIG. 19, the TS delay volume detection unit 1201 includes connectors 1401a, 1401b, 1401c, reference packet detection units 1402a and 1402b, a delay adjustment unit 1403, a memory 1404, a selection unit 1405, an exchange unit 1406, and connectors 1407 and 1408.

The connectors 1401a and 1401b connect the output from the TS playback unit 148 in the preceding decoding unit 115, to the TS delay volume detection unit 1201.

Because the reference packet detection units 1402a and 1402b, the delay adjustment unit 1403, the memory 1404, and the selection unit 1405 have the same structure as the reference packet detection units 162a and 162b, the delay adjustment unit 165, the memory 164 and the selection unit 165 shown in FIG. 5, a detailed explanation will be omitted here.

The connector 1401c connects the output from the TS playback unit 148 in the preceding decoding unit 115, to the TS delay volume detection unit 1201. The connector 1407 connects the TS decoding unit 1202 of the preceding block to the TS delay volume detection unit 1201. The diversity combining unit 1302a and the diversity combining unit 1302m output of the combining processing unit 1101 is inputted to the connectors 1401 and 1401b by way of the decoding unit 115. The OFDM output data of the diversity combining unit 1302n is inputted to the connector 1401c by way of the decoding unit 115.

The exchange unit 1406 is connected to the TS packet data output of the selection unit 1405 with the TS packet data inputted from the connector 1401. The TS packet data inputted to the exchange unit 1406 with the control of the control unit 1103 which is connected to the connector 1408, is selected as the TS packet data to be outputted to the connector 1407.

The connector 1407 connects to the TS packet outputted from the exchange unit 1406, and to the subsequent TS decode unit 1202.

Figure 20:
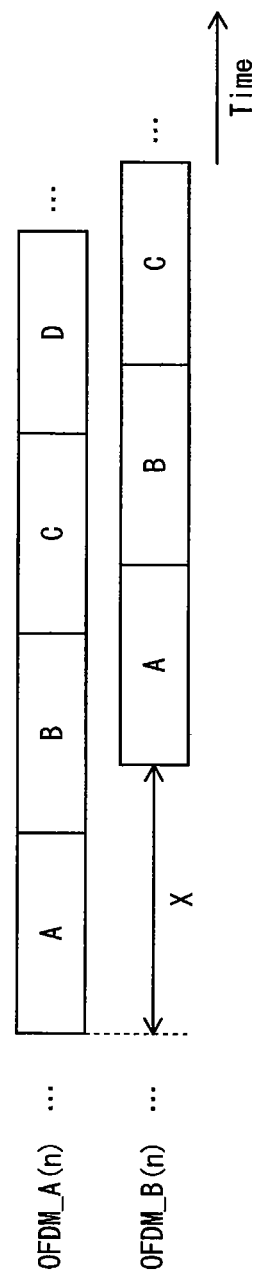
FIG. 20 is a schematic diagram showing one example of two receiving OFDM signals of Embodiment 2 of the present invention.

Here the TS delay volume adjustment unit 1303 pertaining to Embodiment 2 of the present invention will be explained using FIG. 20. FIG. 20 shows a schematic diagram, with a time axis, of the signals for each frame of the OFDM_A (n) OFDM signal that is the first system of reception inputted by connectors 1301a and 1301b, and the OFDM_B (n) OFDM signal that is the second system of reception inputted by connectors 1301m and 1301n.

When comparing, for example, OFDM_A (n) with OFDM_B (n), a time amount error of X arises. From this, it is clear that a correct composite signal cannot be generated in this way even with diversity combining. Therefore, both sets of OFDM signal time error amounts should be adjusted so that they fit within the time scope of one frame, with the TS delay volume adjustment unit 1201 using the TS delay adjustment information outputted from the TS delay volume detection unit 1201 of the TS processing unit 1102.

Here, with the above time amount X it is possible to utilize the time difference in frames of the two OFDM signals by using the continuity_counter described in Embodiment 1, and to determine, from the continuity_counter value, which of the two OFDM signals is earlier.

Note that, once able to determine which frame is earlier within one frame, the first OFDM signal to arrive is saved in the buffer, and later retrieved from the buffer to align with the frame head of the OFDM signal of the different relay station which has arrived second. Then, it is possible to combine the two OFDM signals by aligning the timings. Note that, when saving the first OFDM signal of the two to arrive in the buffer, the video from the OFDM signal of the different relay station which has arrived second is the one to be outputted.

Figure 21:
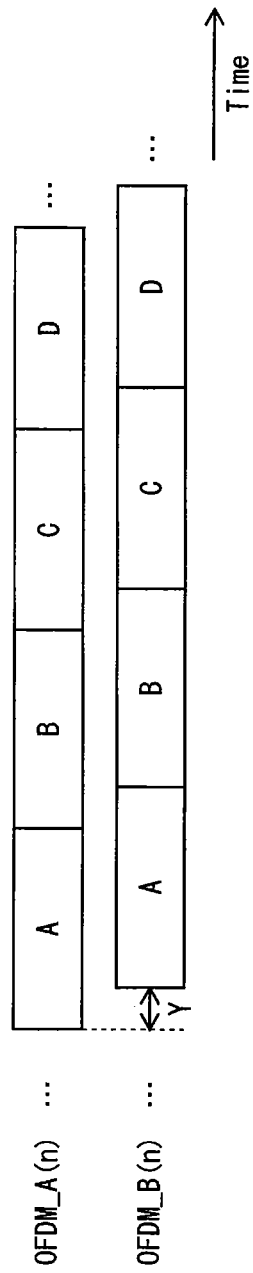
FIG. 21 is a schematic diagram showing one example of an OFDM signal that has been corrected by the TS delay quantity correction unit of Embodiment 2 of the present invention.

FIG. 21 is a schematic diagram with a time axis showing the TS delay volume adjustment unit 1303 adjusting the OFDM time error amount using the TS delay adjustment information.

When comparing OFDM_A (n) and OFDM_B (n), the time error amount is Y. This is a shorter time amount (within one frame) than X shown in FIG. 20. In other words, it is possible limit the adjustment scope of the OFDM signal by using the TS delay adjustment information and adjusting the delay volume between the OFDM signals.

Figure 22:
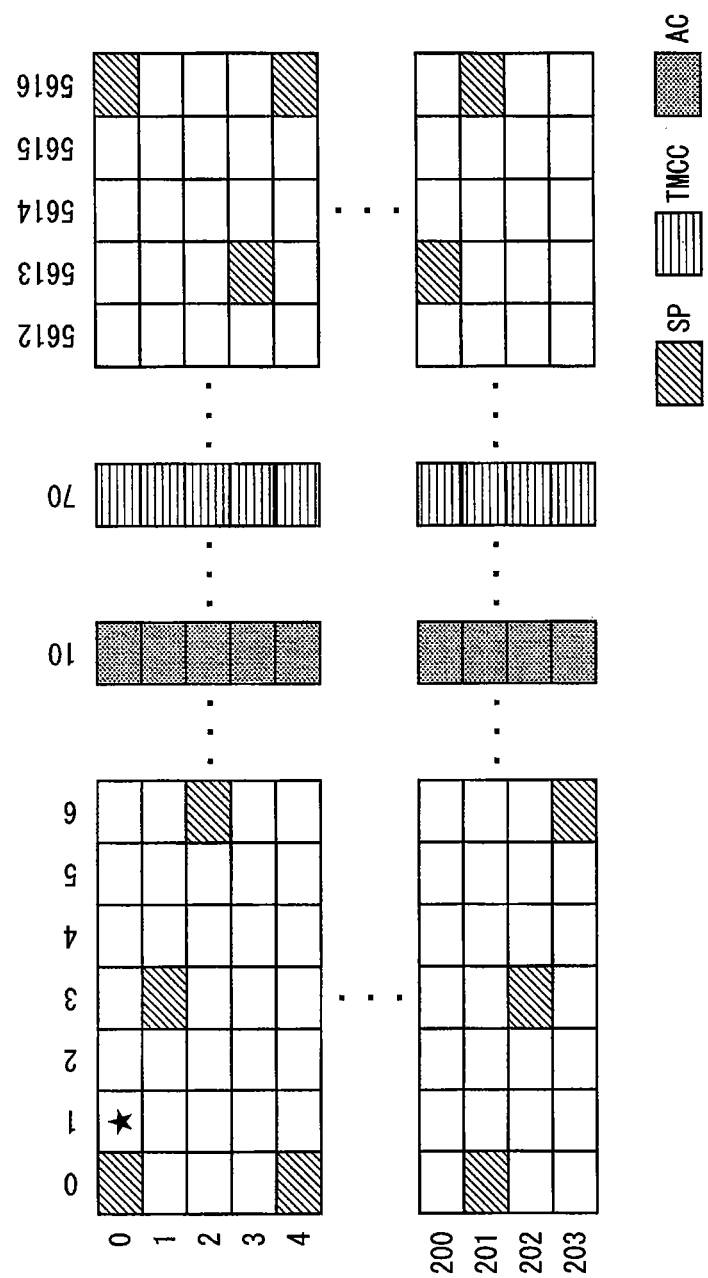
FIG. 22 is a schematic diagram showing one example of the carrier symbol to explain the carrier symbol position error detection and correction unit of Embodiment 2 of the present invention.
Figure 23:
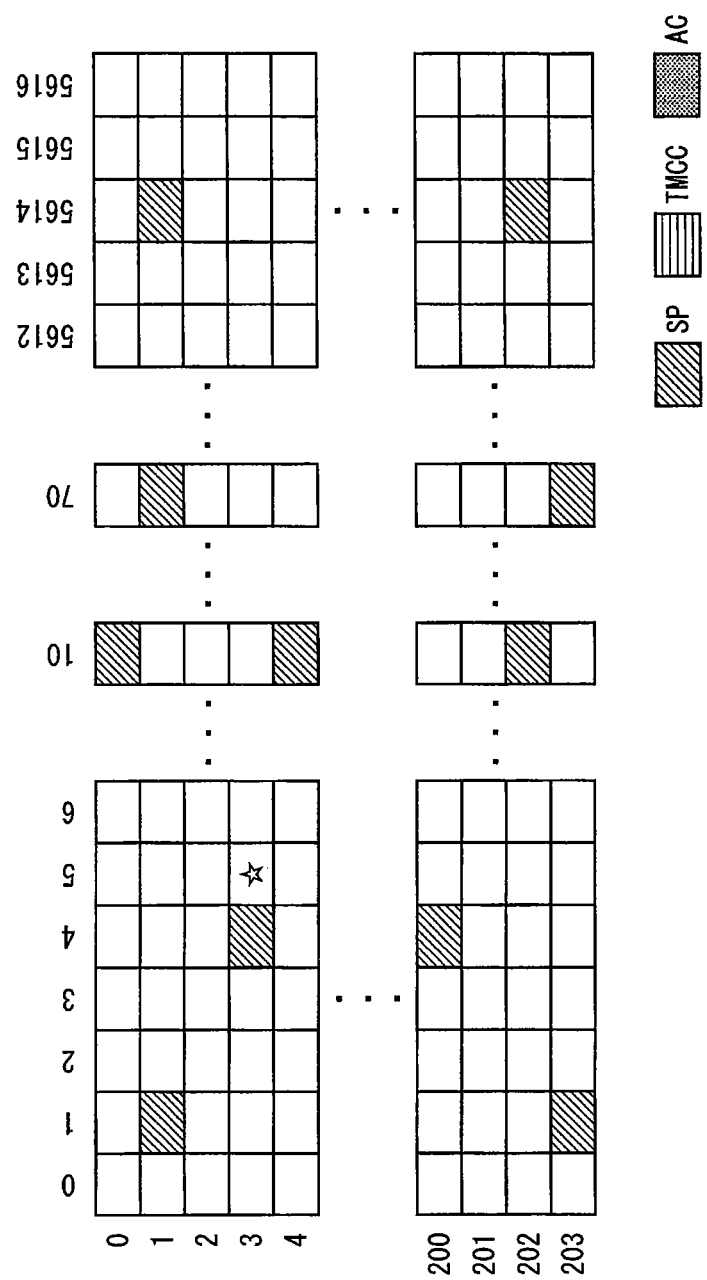
FIG. 23 is a schematic diagram showing one example of the carrier symbol to explain the carrier symbol position error detection and correction unit of Embodiment 2 of the present invention.

Next, the carrier symbol location error detection and adjustment unit 1304 pertaining to Embodiment 2 of the present invention will be described using FIGS. 22 and 23. FIG. 22 is a structure diagram of the OFDM segment of the OFDM signal OFDM_A (n) outputted from the TS delay adjustment unit 1303. FIG. 23 is a structure diagram showing the OFDM segment of the OFDM signal OFDM_B(n) outputted from the TS delay adjustment unit 1303. Here, the OFDM segment structure with the operating standard known as ISDB-T broadcasting standard mode 3 includes SP signals, TMCC (Transmission and Multiplexing Configuration Control) signals, AC (Auxiliary Channel) signals, and audiovisual signals. The OFDM segment makes one signal frame of 5617 carriers (frequencies) and 204 symbols (time).

For example, if the data shown with the black star for the OFDM_A (n) in FIG. 22 and the data shown with the white star for the OFDM_B (n) in FIG. 23 have the same content, these data will be carrier 4, symbol 3.

Accordingly, the carrier symbol location error detection and adjustment unit 1304 detects the carrier symbol error volume of the OFDM_A (n) black star and the OFDM_B (n) white star. For the carrier symbol location error volume detection method, for example, it is possible to detect errors using the SP signal inserted in fixed intervals in the OFDM signal, or the TMCC signals places in the fixed carrier location by transfer parameter.

It is possible to align the carrier symbol locations of the OFDM_A (n) and OFDM_B (n) by performing adjustment based on the detected error volume.

With the above structure, it is possible to perform diversity combining using the broadcast frequencies of relay stations of different channels when receiving broadcast signals at the same time made of the same TS packets on different frequencies, for areas where signals sent by a plurality of relay stations can be received.

Figure 24:
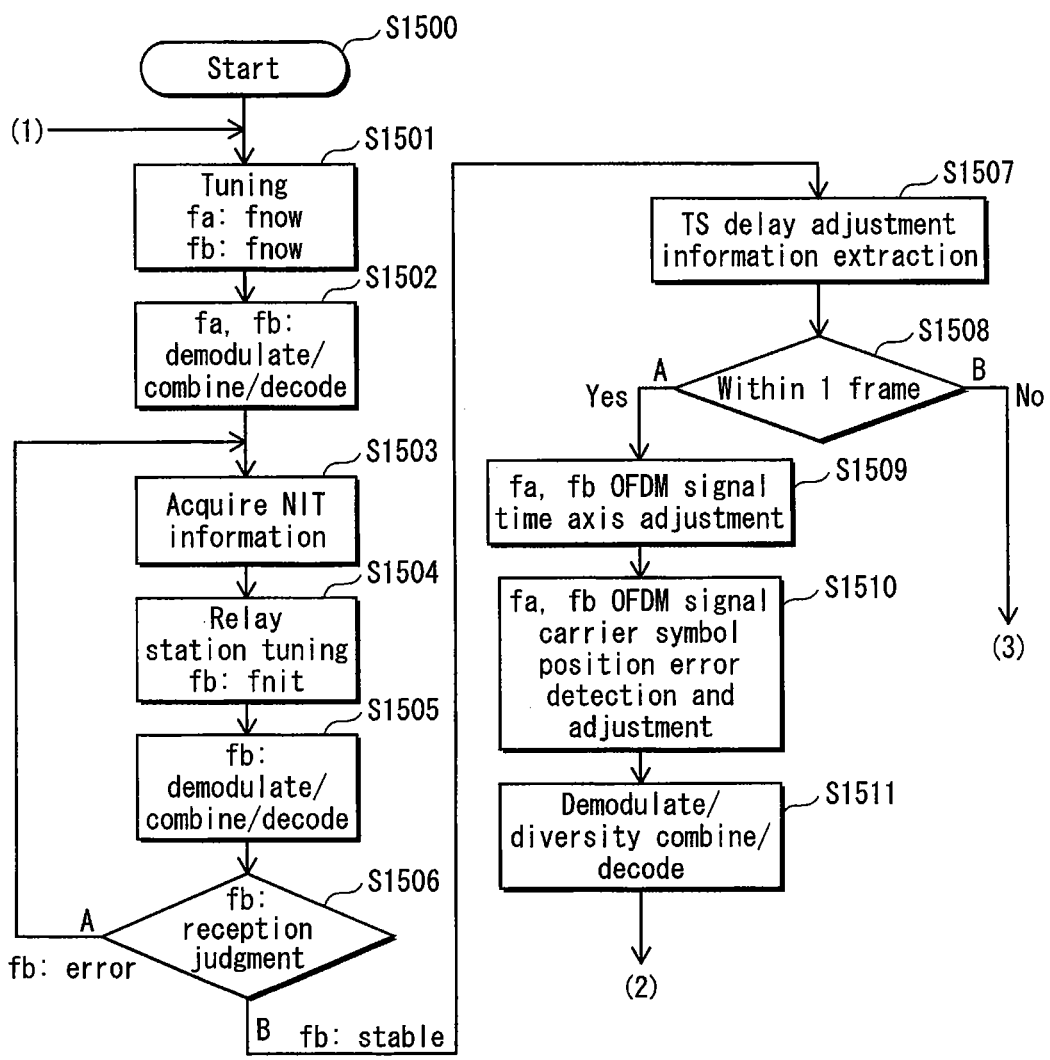
FIG. 24 is a flow chart showing one example of the operations of the digital broadcast receiver of Embodiment 2 of the present invention.
Figure 25:
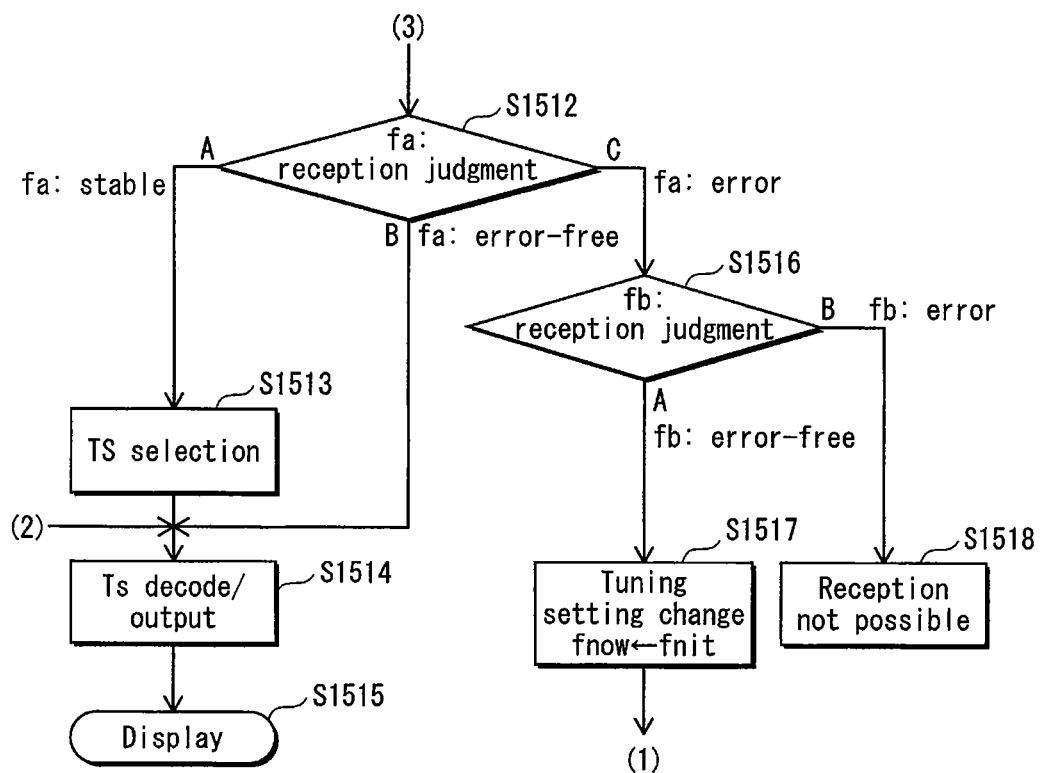
FIG. 25 is a flow chart showing one example of the operations of the digital broadcast receiver of Embodiment 2 of the present invention.

Next one operation example for the digital broadcast receiver 1100 of FIG. 16, pertaining to Embodiment 2 of the present invention, will be explained using the flowcharts in FIGS. 24 and 25.

When the digital broadcasting device 1100 is in an area where reception of the frequency fnow is possible (Step S1500), then the frequency fa is designated as fnow with the tuning settings of the first system of reception, and the frequency fb is designated as fnow with the tuning settings of the second system of reception (Step S1501). Demodulation, diversity combining and decode processing are performed for the first and second systems of reception (Step S1502). NIT information is acquired from the information included in the TS packet data of one of the decoded systems of reception, for example, the first system of reception, and information of a relay station that is the same as the broadcast wave of the currently viewed broadcast is extracted from the NIT information (Step S1503). Using the extracted relay station information (relay station frequency: fnit) as a standard, the second system of reception is changed from the frequency fb to the frequency fnit (Step S1504). Then, the demodulation process, diversity combining and decoding process is performed (Step S1505). When it is determined that there is an error with the reception judgment of the second system of reception (Step S1506A), then the NIT information is confirmed, and tuning reception re-initiated for the relay station.

Alternatively, when it is determined that the reception judgment of the second system of reception is stable (Step S1506B), then TS delay adjustment information that is the time difference for the TS packet data of the TS packet data of the first and second systems of reception is extracted (Step S1507). If the TS delay adjustment information is within one frame (Step S1508A), then, using the TS delay adjustment information, both sets of OFDM signal time error amounts are adjusted so that they fit within the time scope of one frame (Step S1509). Then, carrier symbol location error detection and adjustment is performed for both sets of OFDM signals that fit within one frame, and the timings aligned (Step S1510). Then, the demodulation process, diversity combining and decoding process is performed for both aligned OFDM signals (Step S1511). The TS packet data is decoded (Step S1514), and the result outputted to the display unit (Step S1515).

If the TS delay adjustment information is not within one frame (Step S1508B), then reception judgment is made for the first system of reception that is the current target of viewing (Step S1512), and when the first system of reception is judged to be error-free (Step S1512B), the TS packet data of the first system of reception is decoded (Step S1514), and the result outputted to the display unit (Step S1515). Alternatively, when the first system of reception is judged to be stable (Step S1512A), TS packets are selected by packet and the output of the TS packet data is exchanged with the selection unit 1405 of the TS delay volume detection unit 1201 based on the reception quality information or TS quality information from the control unit 1103 (Step S1513). The TS packet data generated by the exchange is decoded (Step S1514), and the result outputted to the display unit (Step S1515). Also, when it is determined that there is an error with the first system of reception (Step S1512C), reception judgment is made of the second system of reception (Step S1516). If the judgment of step S1516 finds that the second system of reception is error-free (Step S1516A), the tuning of the first system of reception that is currently the target of viewing is changed from the frequency fa to the frequency fnit (fnow becomes fnit), (Step S1517), and the process returns to step S1501. Also, when the judgment of step S1516 finds that the second system of reception has an error (Step S1516B), then reception becomes impossible (Step S1517), and converting to a strong reception level or altering the number of antenna branches used in the reception system becomes necessary.

Note that the stability shown as the reception judgment result in Step S1506 and Step S1512 does not mean, for example, that the signal quality was error-free within a predetermined time frame, but had a reception quality that included a permissible fixed error volume.

Figure 26:
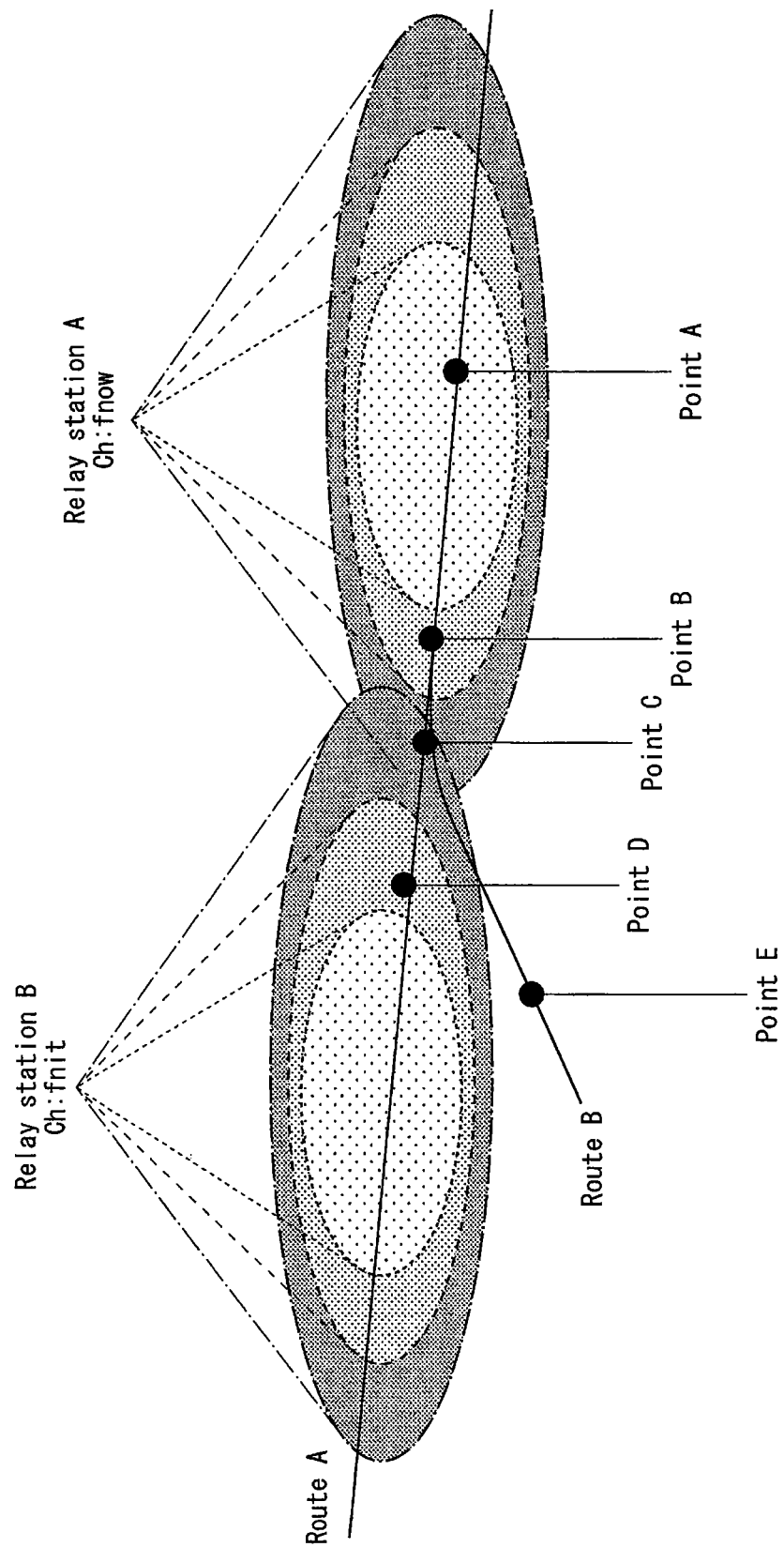
FIG. 26 is a schematic diagram of a visualization of the reception areas of the MFN environment relay stations and the routes of the moving body, of Embodiment 2 of the present invention.

FIG. 26 is a schematic diagram showing the reception on a relay station reception area and the route of the moving vehicle, when broadcast signals made up of the same TS packet data are received at the same time with different frequencies, for each area which can receive signals sent from a plurality of relay stations. When the receiver proceeds on route A from point A to point D, point A is a reception area where broadcast waves can be received on a weak layer (full-seg) from relay station A, however, broadcast waves cannot be received from relay station B. The receiver extracts NIT information from the relay station A broadcast waves, acquiring relay station information (broadcast frequency information of relay station B). Using the relay station information as a standard, the tuning frequencies of the two systems of reception are set, and a relay station search is performed. Accordingly it is possible to receive broadcast waves from relay station A and view the broadcast at point A.

Next, point B is in an area where the frequency waves of relay station A are receivable with diversity combining using the first system of reception. Also, the frequency waves of relay station B are receivable only on a strong layer (one-seg) with diversity combining using the second system of reception. The receiver is able to judge when the frequency, that is the target of the NIT information extracted from the broadcast waves of relay station A, is present in the frequency of relay station B. Accordingly, at point B, it is possible to view the broadcast by performing diversity combining using the first system of reception on the broadcast waves of relay station A. Also, it is possible for the frequency of relay station B to be disclosed in the NIT information of relay station A.

Point C is in an area where non-error-free reception is possible by performing diversity combining on the broadcast waves of relay station A using the first system of reception. Also, non-error-free reception is possible by performing diversity combining on the broadcast waves of relay station B using the second system of reception. The receiver extracts the delay time of the TS packet data using the TS packet data of the first and second systems of reception, and adjusts the OFDM signal symbol of the first and second systems of reception to be within 1 frame. Furthermore, detection and adjustment of the OFDM signal carrier symbol position error of the first and second systems of reception is performed, and all of the OFDM signal timings aligned and received by diversity combining. Accordingly, it is possible to view the broadcast by diversity combining at point C using the broadcast waves from relay station A and relay station B.

Point D is in an area where frequency waves of relay station A are receivable only on a strong layer (one-seg) with diversity combining using the first system of reception. Also, it is an area where frequency waves of relay station B are receivable with diversity combining using the second system of reception. The receiver is able to judge, from the state of the two systems of reception, when the relay station that is the viewing target changes from relay station A to relay station B.

Accordingly, it is possible to receive broadcast waves from relay station B at point D with diversity combining using the second system of reception. Also, broadcast waves are received from relay station A with diversity combining using the first system of reception. After this, when the reception judgment fully indicates an error, the receiver sets the selection of the first system of reception to relay station B, acquires NIT information from relay station B, and performs a search for the next relay station.

Continuing along route B leads to point E. Point E is away from the area where relay station A and B can be received, and will result in a reception error. Accordingly, converting to a strong reception level or altering the number of antenna branches used in the reception system becomes necessary.

Figure 27:
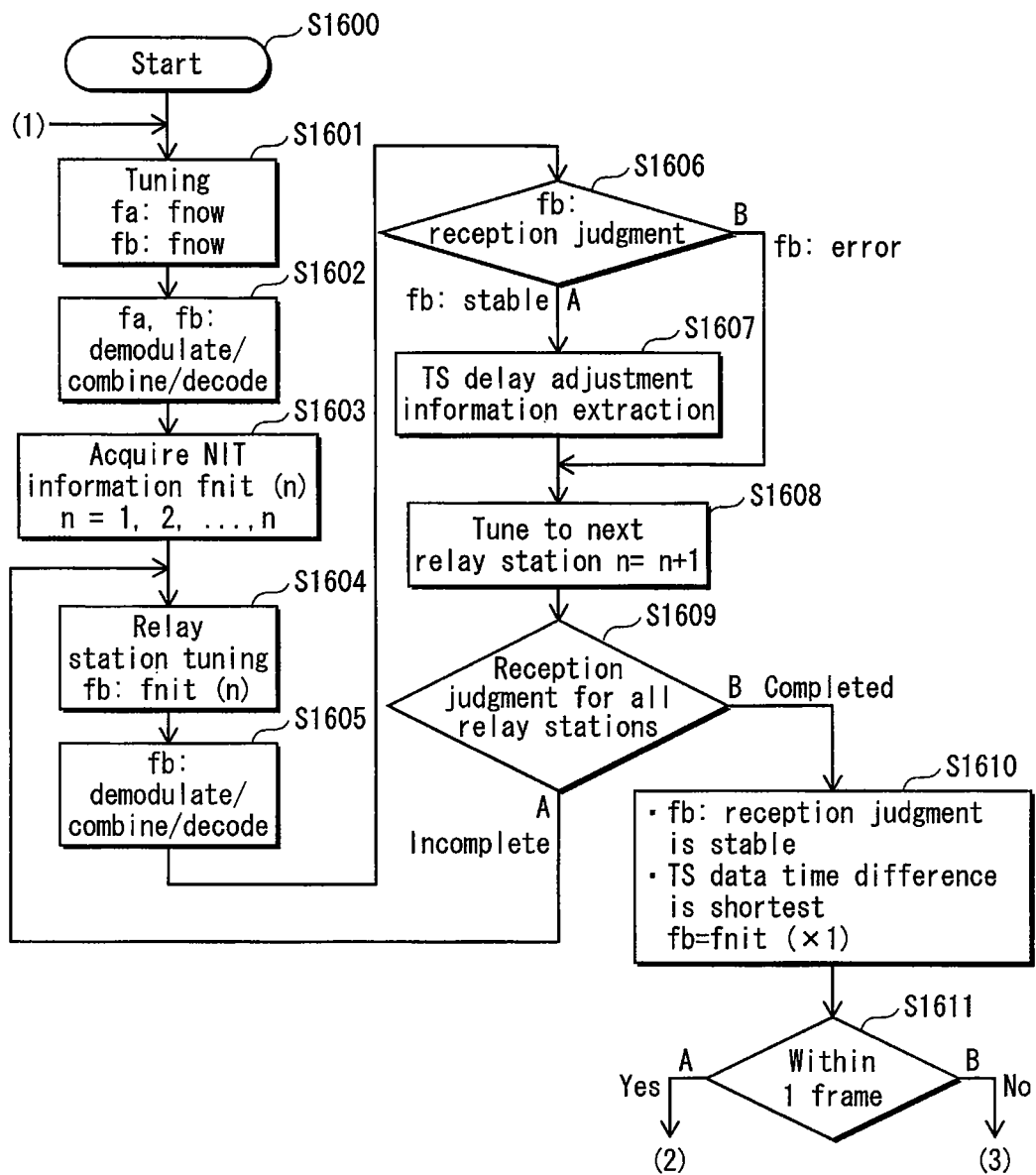
FIG. 27 is a flow chart showing one example of the operations of the digital broadcast receiver of Embodiment 2 of the present invention.
Figure 28:
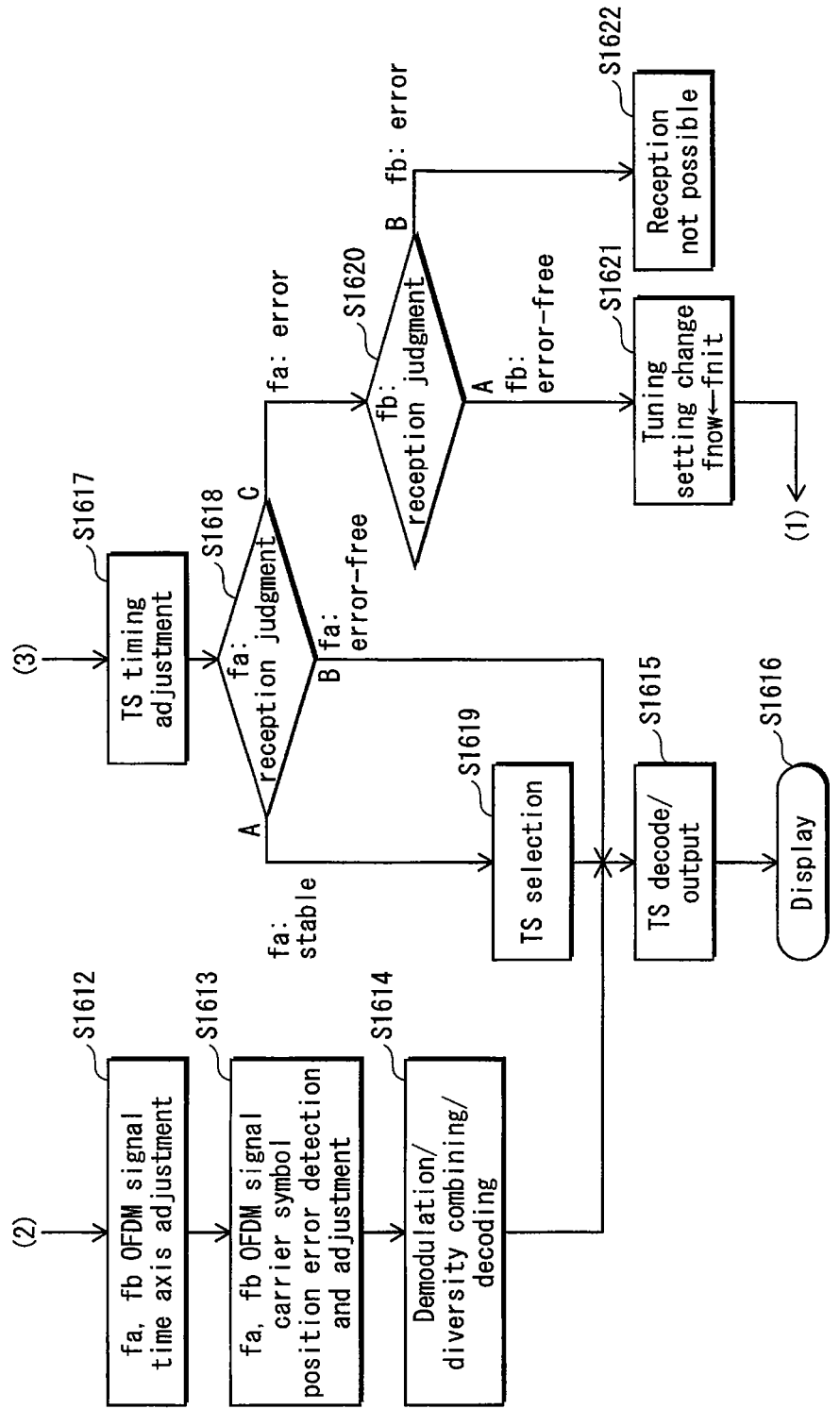
FIG. 28 is a flow chart showing one example of the operations of the digital broadcast receiver of Embodiment 2 of the present invention.

Next, an example of the operations of the digital broadcast receiver 1100, of FIG. 16 that pertains to Embodiment 2 of the present invention, when there are a plurality of relay stations, will be described using the flowcharts of FIGS. 27 and 28.

When located in an area where reception of the frequency fnow is possible (Step S1600), the digital broadcast receiver 1100 makes the frequency fa into fnow with the tuning setting of the first system of reception, and makes the frequency fb into fnow with the tuning setting of the second system of reception (Step S1601). Demodulation, diversity combining and decoding are performed for the first and second systems of reception (Step S1602). NIT information is acquired from the information included in the TS packet data of a decoded system of reception, for example, the first system of reception. Then, from the NIT information, relay station information is extracted that is the same as that of the broadcast waves of the broadcast currently being viewed (Step S1603). Here, when there is a plurality of relay station information extracted, (relay station frequency: fnit (n), n=1, 2, ..., n), the frequency fb is tuned to the relay station fnit (1) that was first detected, with the tuning settings of the second system of reception (Step S1604). Demodulation, diversity combining and decoding is performed (Step S1605), and reception judgment of the second system of reception is performed (Step S1606). When the reception judgment of the second system of reception in Step S306 is that the second system of reception has an error (Step S1606B), the next relay station is selected (Step S1608), and judgment is made as to whether or not the reception judgment has been completed for all of the relay stations (Step S1609). In Step S1609, when judgment has been completed for all of the relay stations (Step S1609A), Step S1604 is returned to, and the next relay station selected, and demodulation, diversity combining and decoding are performed. Alternatively, when the reception judgment of the second system of reception in Step S1606 is that the second system of reception is stable (Step S1606A), the time error in TS packet data between the TS packet data of the first system of reception and the TS packet data of the second systems of reception is extracted (Step S1607), and the next relay station is selected (S1608). When reception judgments have been made for all of the relay stations in Step S1609 (Step S1609B), then the relay station that is judged to be stable and that has TS packet data with the shortest time difference, is tuned in to (Step S1610) and judgment is made as to whether or not the TS delay information is within one frame (Step S1611).

When it is judged in Step S1611 that the TS delay information is within one frame (Step S1611A), then, using the TS delay adjustment information, adjustment is performed so that the time error volume of both sets of OFDM signals are within one frame (Step S1612). Next, detection and adjustments are performed of the carrier symbol position errors for both sets of OFDM signals that fit within one frame. Then, the timings of all OFDM signals are aligned (Step S1613). Demodulation, diversity combining and decoding is performed for both aligned sets of OFDM signals (Step S1614), with the results being decoded to the outputted TS packet data (Step S1615) and outputted to the display unit (Step S1616).

When it is judged in Step S1611 that the TS delay information is not within one frame (Step S1611B), then timing adjustments are performed for both sets of TS packet data (Step S1617), and reception judgment is made for the first system of reception that is currently being viewed (Step S1618). When it is judged in Step S1618 that the TS delay information is error-free (Step S1618B), then the TS packet data of the first system of reception is decoded (Step S1615), and outputted to the display unit (Step S1616). When it is judged in step S1618 that the first system of reception is judged to be stable (Step S1618A), then, using the reception quality information or TS quality information from the control unit 1103 as a standard, TS packets are selected by packet with the selection unit 1404 of the TS delay volume detection unit 1201. Then, the TS packet data output is exchanged (Step S1619). The exchanged and generated TS packet data is decoded (Step S1615), and outputted to the display unit (Step S1616). Also, when the first system of reception is judged to contain an error (Step S1618C), a reception judgment of the second system of reception is performed (Step S1620). When it is judged in step S1620 that the second system of reception is error-free (Step S1620A), then the frequency fa is made to be fnit (fnow is fnit) within the tuning settings of the first system of reception that is the viewing target (Step S1621), and the process returns to Step S1601. Also, when it is judged in step S1620 that the second system of reception has an error (Step S1620B), then reception is not possible (Step S1622), and for this reason exchanging to a strong reception level or altering the number of antenna branches used in the reception system becomes necessary.

Note that the stability shown as the reception judgment result in Step S1606 and Step S1618 does not mean, for example, that the signal quality was error-free within a predetermined time frame, but that it had a reception quality that included a permissible fixed error volume.

Note also that, when a plurality of pieces of relay station information are extracted from the NIT information, the relay station that is selected in Step 1610 is the relay station that is judged to be stable and that has the shortest TS delay compensation information. By selecting the relay station in this way, it is possible to suppress the memory volume, needed when adjusting the delay time of the TS packet data, to the minimum.

When there is a large amount of TS delay compensation information, for example, when layer transferring with ISDB-T broadcast standards, and there is a large amount of TS delay compensation information, time adjustment may be performed only in regards to broadcast waves which are receivable with a weak electronic field (one-seg broadcasting)

Note that it may be confirmed whether or not the TS packet data of each layer broadcast has the same content, among the TS packet data gained with the first or second systems of reception.

In this example, the relay station with the shortest TS delay compensation information is given priority, and tuned in to, however, it is also possible to prioritize the reception quality information or the TS quality information. Also, the limitations of the TS delay compensation information may be decided in response to the circuit scale.

In Embodiment 1 of the present invention, reception for audiovisual use and relay detection reception were performed with a first system of reception made with two antenna, and a second system of reception made with two antenna. However, the number of antennae for each system of reception might be allocated differently than 2:2, i.e. 3:1 or 1:3, corresponding to the reception quality information or TS quality information.

Figure 29:
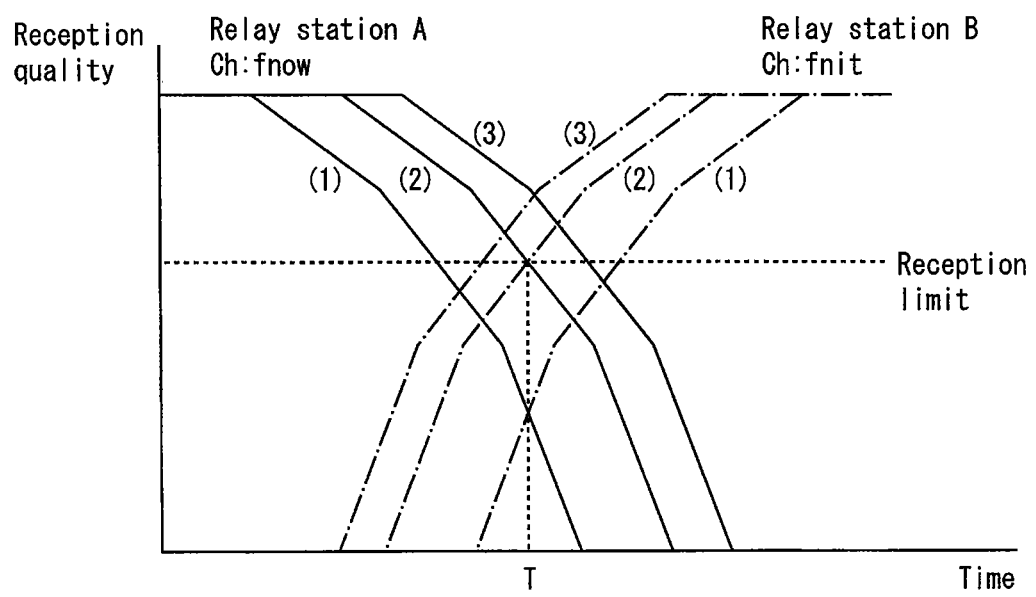
FIG. 29 is a schematic diagram showing one example of the antenna division of the digital broadcast receiver of Embodiment 2 of the present invention.
Figure 30:
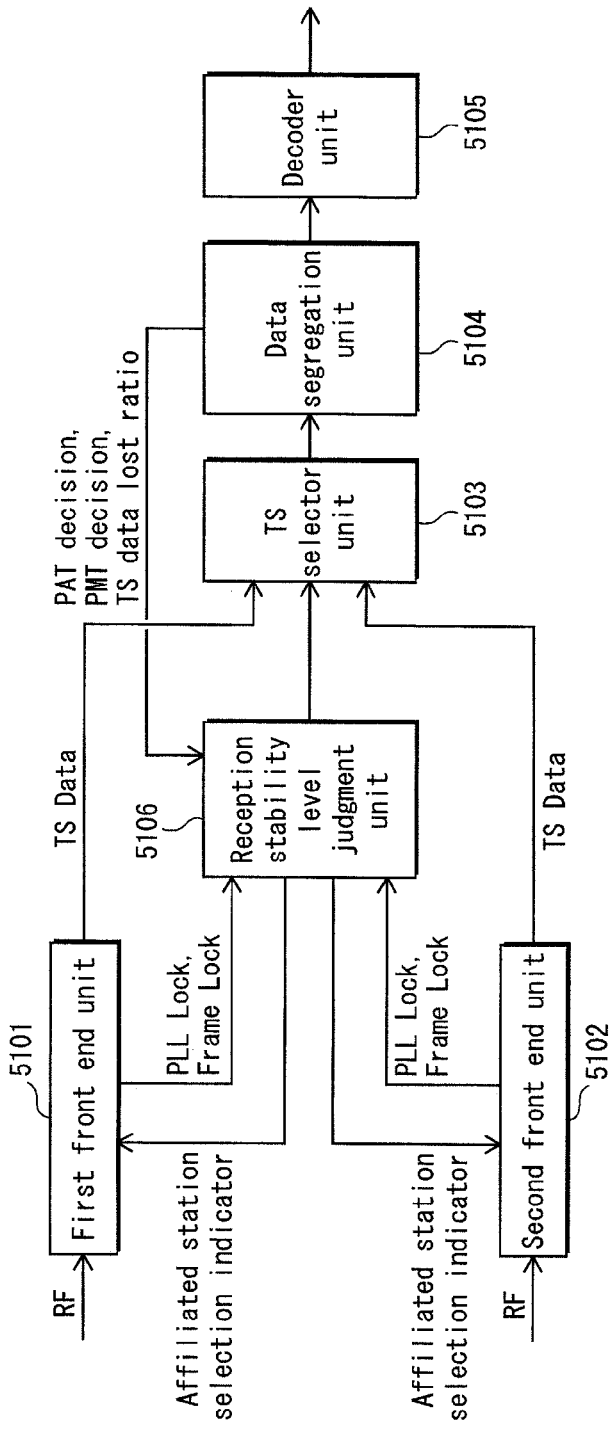
FIG. 30 is a block diagram of the conventional first digital broadcast receiver.
Figure 31:
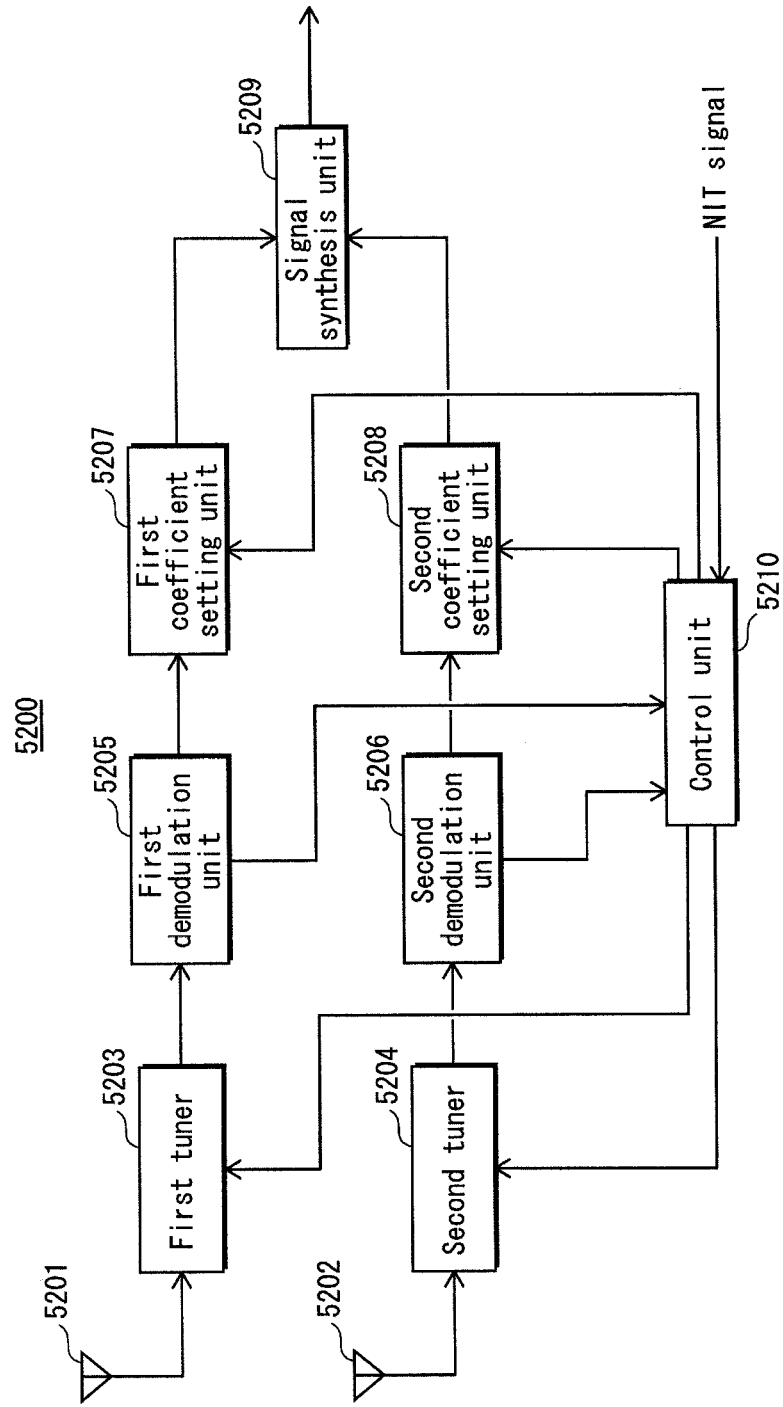
FIG. 31 is a block diagram of the conventional second digital broadcast receiver.

For example, FIG. 29 shows one example of an allocation of reception system antennae and reception quality information. In the diagram, the vertical axis shows reception performance quality, and the horizontal access shows the passage of time as the receiver moves from relay station A to relay station B. The solid lines show the reception performance quality when receiving from relay station A with different numbers of antennae. The broken lines show the reception performance quality when receiving from relay station B with different numbers of antennae. On the diagram, (1) shows reception using one antenna, (2) shows reception using two antennae and (3) shows reception using three antennae. When the relay station A currently receiving is able to be received with one antenna with no errors, three antennae are used to search for or receive relay station B. When it is difficult to use one antennae to receive the relay station A, then two antennae may be used, and the number of antennae allocated to the relay station B changed to two. Because at point T, the reception qualities of relay stations A and B interchange, the number of antennae to receive relay station A goes from two antennae to one antenna, and the number of antennae to receive relay station B goes from two antennae to three antennae. In other words, by allocating the number of antennae to each system of reception in response to reception quality, diversity combining using high-quality OFDM signals is possible. Also, when a plurality of relay stations are detected, then by performing allocation of antennae taking into account TS delay compensation information, even higher quality diversity combining becomes possible.

With this invention, by using the time difference between the two sets of TS packet data when receiving broadcast from different relay stations in an MFN environment, it is possible to align the timings at the OFDM signal stage, perform diversity combining with the MFN relay station, and realize a digital broadcast receiver with improved reception quality.

[Supplementary Explanation 1]

The present invention is not limited to the examples described in the above embodiments, but rather may be used in any form that achieves the object of the present invention or a related object. For example, the following modifications are possible.

1. In Embodiment 1, the delay adjustment unit 163 identifies TS packet sequences of the TS packets using the continuity_counter included in both sets of TS packets, to find the reception timing differences between the same TS packets as a result of the identification. However, the present invention is not limited to this.

For example, sets of TS packet data (payload, etc) may be analyzed to determine if they are the same. Then, reception timing differences may be found for the TS packets which have been determined to be the same. Also, based on this determination, already received TS packets may be buffered within the memory 164.

The combining processing unit 1101 of the digital broadcast receiver 1100 of Embodiment 2 detects and adjusts the location error of the carrier and symbol with the carrier symbol location error detection and adjustment unit 1304. However, this is not necessary if detection of the two OFDM signal frames using the continuity_counter, and detection in each frame head is possible, as the carrier symbol timings will be aligned.

2. In Embodiment 2, it was explained that SP signals or TMCC signals are used for the carrier symbol location error volume detection method, but SP signals are not especially necessary.

It is possible to detect the head of each frame by using TMCC signals, and also, it is possible to align both OFDM signal time error volumes within the scope of one frame.

3. In Embodiments 1 and 2, the explanation focused on an example where timing differences were adjusted for two systems of reception. However, it is also possible to have an optional number of systems of reception such as 3 or 4 instead of just 2.

4. The digital broadcast receiver of Embodiment 1 includes a combining processing unit 114, but this is not essential.

5. In Embodiments 1 and 2, ISDB-T was used as one example of a digital broadcasting method, but it is also possible to use other methods such as DVB-T (Digital Video Broadcasting—Terrestrial) or DAB (Digital Audio Broadcast).

[Supplementary Explanation 2]

1. The digital broadcast receiver pertaining to the embodiments of the present invention may include; a plurality of tuning units that acquire, from among OFDM signals received with an antenna, OFDM signals of a tuned-to frequency band, a demodulation unit that performs demodulation processes appropriate to each of the plurality of OFDM signals received from the plurality of tuning units, a decoding unit that decodes error correction, in correspondence with the equalized signals outputted from the plurality of demodulation units, and a TS processing unit that selects and outputs TS packet data outputted to the display unit, from among a plurality of TS packet units outputted from the decoding unit, wherein the TS processing unit detects an acquired timing difference between TS packet data received from at least two systems of reception and aligns the processing timings of the TS packet data acquired from the at least two systems of reception so as to delay part of the TS packet data according to the timing difference acquired from the detection, to select the TS packets for output.

2. Also, the TS processing unit may include; a detection unit that detects timing information from TS packet data acquired from at least two systems of reception, a delay adjustment unit that performs delay adjustment for at least one of the two sets of received TS packet data based on the timing information detected by the detection unit, and a selection unit that selected TS packet data outputted to the display unit based on the TS packet data that has been delay adjusted by the delay adjustment unit.

3. Also, the timing information may be a TS_Sync signal that is synchronous signal.

4. The digital broadcast receiver pertaining to the embodiments of the present invention may include; a plurality of tuning units that acquire, from among OFDM signals received with an antenna, OFDM signals of a tuned-to frequency band, a demodulation unit that performs demodulation processes appropriate to each of the plurality of OFDM signals received from the plurality of tuning units, a diversity combining unit that receives equalization-processed signals outputted from the plurality of demodulation units, and upon calculating a weighting ratio, performs signal combining, a decoding unit that decodes of error correction, etc in correspondence with the diversity combining results, and a TS processing unit that performs processing of a plurality of TS packet data outputted from the decode unit, wherein the TS processing unit detects an acquired timing difference between TS packet data received from at least two systems of reception and feeds the detected result back to the diversity combining unit, and the diversity combining unit combines a signal after amending the acquired timing difference between the plurality of OFDM signals, using the acquired timing difference of the TS packet data that was fed back.

5. Also, with the TS processing unit, a judgment may be made as to whether or not the timing difference in the TS packet data is less than the length of the OFDM frame, and with the diversity combining unit, information may be acquired that confirms whether or not a received timing difference of a received signal belongs to a timing difference that is shorter than the OFDM frame length, and, if the received timing difference of the signal is shorter than the OFDM frame length, combining may be performed by symbol or carrier after adjusting the received timing difference of the signal.

6. The digital broadcast receiving method of the embodiments of the present invention may comprise the steps of: extracting, with a plurality of tuning units, OFDM signals of a selected frequency band from among OFDM signals received using antennae; demodulating, with a plurality of demodulation units, a plurality of OFDM signals received from the plurality of tuning units; receiving an equalized signal outputted from the plurality of demodulation units, and composing the signal after calculating the weighting ratio; error correction decoding of the diversity combining results and TS processing, with a TS processing unit, of a plurality of TS packet data outputted by the decoding unit, wherein in the TS processing, an acquired timing difference between TS packet data received from at least two systems of reception is calculated, the processing timings of the TS packet data acquired from the at least two systems of reception are aligned by delaying a portion of the TS packet data in accordance with the detected acquired timing difference, and the TS packet data to be outputted is selected.

7. The digital broadcast receiving method of the embodiments of the present invention comprising the steps of: extracting, with a plurality of tuning units, OFDM signals of a selected frequency band from among OFDM signals received using antennae; demodulating, with a plurality of demodulation units, a plurality of OFDM signals received from the plurality of tuning units; receiving an equalized signal outputted from the plurality of demodulation units, and composing the signal after calculating the weighting ratio; error correction decoding of the diversity combining results, and TS processing, with a TS processing unit, of a plurality of TS packet data outputted by the decoding unit, wherein in the TS processing, an acquired timing difference between TS packet data received from at least two systems of reception is calculated, and the detected result fed back to the diversity combining unit, and in the diversity combining, a signal is combined after correcting the acquired timing difference between the plurality of OFDM signals, using the acquired timing difference of the TS packet data that was fed back.

INDUSTRIAL APPLICABILITY

The digital broadcast receiver of the present invention can be used in the home or loaded into a moving body such as a vehicle. The variety, size, appearance, shape and performance of the digital broadcast receiver is of no importance.

REFERENCE SIGNS LIST

100 Digital broadcast receiver
110 Antenna unit
111 Connector
112 Tuning unit
113 Demodulation unit
114 Combining processing unit
115 Decoding unit
116 TS processing unit
117 Control unit
118 Connector
119 Display unit
131 A/D conversion unit
132 Quadrature detection unit
133 FFT processing unit
134 Equalization unit
141 De-interleaving unit
142 De-mapping unit
143 Bit de-interleaving unit
144 Decoding unit
145 Byte de-interleaving unit
146 Reverse energy diffusion unit
147 RS decoding unit
148 TS playback unit
151 TS selection unit
152 TS decode unit
153 MPEG decode unit
161 Connector
162 Reference packet detection unit
163 Delay adjustment unit
164 Memory
165 Selection unit
166 Connector
167 Connector
1100 Digital broadcast receiver
1101 Combining processing unit
1102 TS processing unit
1103 Control unit
1201 TS delay volume detection unit
1202 TS decode unit
1203 MPEG decode unit
1301 Connector
1302 Diversity combining unit
1303 TS delay volume adjustment unit
1304 Carrier symbol position error detection and adjustment unit
1305 Memory
1306 Connector
1401 Connector
1402 Reference packet detection unit
1403 Delay adjustment unit
1404 Memory
1405 Selection unit
1406 Exchange unit
1407 Connector
1408 Connector

The invention claimed is:

1. A digital broadcast receiver comprising:
a plurality of tuning units that acquire, from among OFDM signals received with an antenna, OFDM signals of a tuned-to frequency band;
a plurality of demodulation units that perform demodulation processes on a plurality of OFDM signals received from the plurality of tuning units;
a diversity combining unit that receives equalized signals output from the plurality of demodulation units, calculates a weighing ratio, and performs combining of equalized signals for each one of at least two systems of reception, using the calculated weighting ratio;
a decoding unit that performs decoding of the diversity combining results the decoding involving error correction; and a TS processing unit that performs processing of a plurality of pieces of TS packet data information output from the decoding unit, wherein the TS processing unit calculates a difference in acquisition timings between pieces of TS packet data information received from each one of the at least two systems of reception and feeds the calculated difference back to the diversity combining unit, the TS processing unit synchronizes a processing timing of the pieces of TS packet data information acquired from each one of the at least two systems of reception, by delaying a portion of the pieces of TS packet data information in accordance with the calculated difference in acquisition timings, and the diversity combining unit adjusts a difference in the acquisition timings between the equalized signals and uses the difference in the acquisition timings between the pieces of TS packet data information that were fed back to combine the equalized signals.

2. The digital broadcast receiver of claim 1, further comprising:

a detection unit that detects timing information for each piece of TS packet data information acquired by the at least two systems of reception;

a delay adjustment unit that performs delay adjustment of at least one of the pieces of acquired TS packet data based on the timing information detected by the detection unit and a selection unit that selects TS packet data to be outputted for display, based on the TS packet data that has been delay-adjusted by the delay adjustment unit.

3. The digital broadcast receiver of claim 2, wherein the timing information is a continuity counter that is a counter assigned to packets and is included in each of the pieces of TS packet data information.

4. The digital broadcast receiver of claim 1, wherein the TS processing unit judges whether or not the timing difference in the TS packet data information is less than a length of an OFDM frame, and the diversity combining unit acquires information that confirms whether or not a received timing difference of a received signal is shorter than the length of the OFDM frame, and if the received timing difference of the signal is shorter than the length of the OFDM frame, the signals are combined by symbol or by carrier after adjusting the received timing difference of the signal.

5. A digital broadcast receiving method comprising the steps of:

acquiring, with a plurality of tuning units, OFDM signals of a tuned-to frequency band from among OFDM signals received with an antenna;

demodulating, with a plurality of demodulation units, a plurality of OFDM signals received from the plurality of tuning units;

receiving, an equalized signal outputted from the plurality of demodulation units, calculating a weighting ratio, and combining the equalized signal for each one of at least two systems of reception, using the calculated weighting ratio;

performing decoding of the diversity combining results involving error correction; and performing TS processing, with a TS processing unit, of a plurality of pieces of TS packet data information output by the decoding unit, wherein in the TS processing, a difference in acquisition timings between pieces of TS packet data information received from each of the at least two systems of reception is calculated and the calculated difference fed back to the diversity combining unit, the processing timings of the pieces of TS packet data information acquired from each of the at least two systems of reception are synchronized, by delaying a portion of the pieces of TS packet data information in accordance with the calculated difference in acquisition timings, and in the diversity combining, the equalized signals are combined after adjusting the difference in acquisition timings between the equalized signals, using the difference in acquisition timings between the pieces of TS packet data information that were fed back.

* * * * *